(12) United States Patent
Cole

(10) Patent No.: US 11,784,476 B2
(45) Date of Patent: Oct. 10, 2023

(54) MODULAR JUNCTION BOX

(71) Applicant: BLOOMSBURG CARPET INDUSTRIES, INC., Bloomsburg, PA (US)

(72) Inventor: Scott Cole, Bloomsburg, PA (US)

(73) Assignee: Bloomsburg Carpet Industries, Inc., Bloomsburg, PA (US)

( * ) Notice: Subject to any disclaimer, the term of this patent is extended or adjusted under 35 U.S.C. 154(b) by 145 days.

(21) Appl. No.: 17/509,728

(22) Filed: Oct. 25, 2021

(65) Prior Publication Data

US 2023/0126420 A1    Apr. 27, 2023

(51) Int. Cl.
*H02G 3/08*    (2006.01)

(52) U.S. Cl.
CPC .................................. *H02G 3/081* (2013.01)

(58) Field of Classification Search
CPC ........... H02G 3/081; H02G 3/08; H02G 3/086
USPC ................................................. 220/3.94, 3.2
See application file for complete search history.

(56) References Cited

U.S. PATENT DOCUMENTS

| | | | | |
|---|---|---|---|---|
| 564,443 A * | 7/1896 | Mezger | ................. | H02G 3/086 220/3.94 |
| 564,527 A * | 7/1896 | Mezger | ................. | H02G 3/086 220/241 |
| 1,051,942 A | 2/1913 | Appleton | | |
| 1,120,472 A * | 12/1914 | Freeman | ................ | H02G 3/086 220/3.94 |
| 2,028,509 A | 1/1936 | Knell | | |
| 3,168,613 A * | 2/1965 | Palmer | ................... | H02G 3/086 174/650 |
| 4,896,784 A * | 1/1990 | Heath | ...................... | H02G 3/14 174/53 |
| 5,848,718 A * | 12/1998 | Colwell | ................. | H02G 3/081 220/3.94 |
| 6,328,177 B2 * | 12/2001 | Goudal | ................. | H02G 3/123 220/3.6 |
| 7,435,905 B1 * | 10/2008 | Elder | ................... | H02G 15/113 174/92 |
| 7,628,643 B2 * | 12/2009 | Pyrros | ................. | H01R 25/006 439/535 |
| 8,378,232 B2 * | 2/2013 | Drane | ................... | H02G 3/383 174/559 |

(Continued)

FOREIGN PATENT DOCUMENTS

| | | |
|---|---|---|
| CN | 207021625 | 2/2018 |
| CN | 208596927 | 3/2019 |

(Continued)

OTHER PUBLICATIONS

LeMotech ABS Plastic Dustproof Waterproof IP65 Junction Box Universal Electrical Project Enclosure White; Website: https://www.amazon.com/LeMotech-Dustproof-Waterproof-Electrical-150mmx110mmx70mm/dp/B075DHRJHZ/ref=sr_1_5?dchild=1&keywords=plastic+junction+box&qid=1604968132&sr=8-5; Download date: Dec. 27, 2021; 11 pps.

(Continued)

*Primary Examiner* — Rafael A Ortiz
(74) *Attorney, Agent, or Firm* — Rowan Tree Law Group, PLLC; Carson C. K. Fincham

(57) ABSTRACT

Systems, methods, and articles of manufacture for modular junction boxes. Some modular junction boxes may, for example, comprise integral mating elements that are secured in position by mounting of one or more adapters, connectors, or fittings.

19 Claims, 21 Drawing Sheets

(56) References Cited

U.S. PATENT DOCUMENTS

| | | | |
|---|---|---|---|
| 8,669,471 | B2 | 3/2014 | Temblador et al. |
| 8,710,367 | B2 | 4/2014 | Koresz et al. |
| 9,035,175 | B2 | 5/2015 | Korez et al. |
| 2004/0251043 | A1 | 12/2004 | Chung |
| 2011/0095527 | A1 | 4/2011 | Miyoshi |
| 2011/0259883 | A1* | 10/2011 | DeCosta .................. H02G 3/14 |
| | | | 220/3.94 |
| 2020/0274339 | A1 | 8/2020 | Paddick et al. |

FOREIGN PATENT DOCUMENTS

| | | |
|---|---|---|
| CN | 210806657 | 6/2020 |
| CN | 211126991 | 7/2020 |
| DE | 2546087 | 10/1975 |
| DE | 69000286 | 3/1993 |
| EP | 0921546 | 6/1999 |
| EP | 1249913 | 1/2006 |
| EP | 327296 | 1/2018 |
| EP | 3509174 | 7/2019 |
| JP | S50108623 | 8/1975 |

OTHER PUBLICATIONS

International Search Report for Application PCT/US22/47569 dated Feb. 20, 2023; 5 pps.
Written Opinion for Application PCT/US22/47569 dated Feb. 20, 2023; 8 pps.

\* cited by examiner

MODULAR JUNCTION BOX

BACKGROUND

Junction boxes are utilized in many different applications such as residential, commercial, and industrial plumbing and electrical wiring installations. There are many types of junction boxes that have been developed for a wide variety of applications, and indeed, many junctions box innovations are directed to providing distinct advantages that are often unique to the intended application. While some modular junction box designs have been created to provide for easier or more customizable installation options, such designs often fail to provide the strength or reliability necessary for a wide variety of uses.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1A:
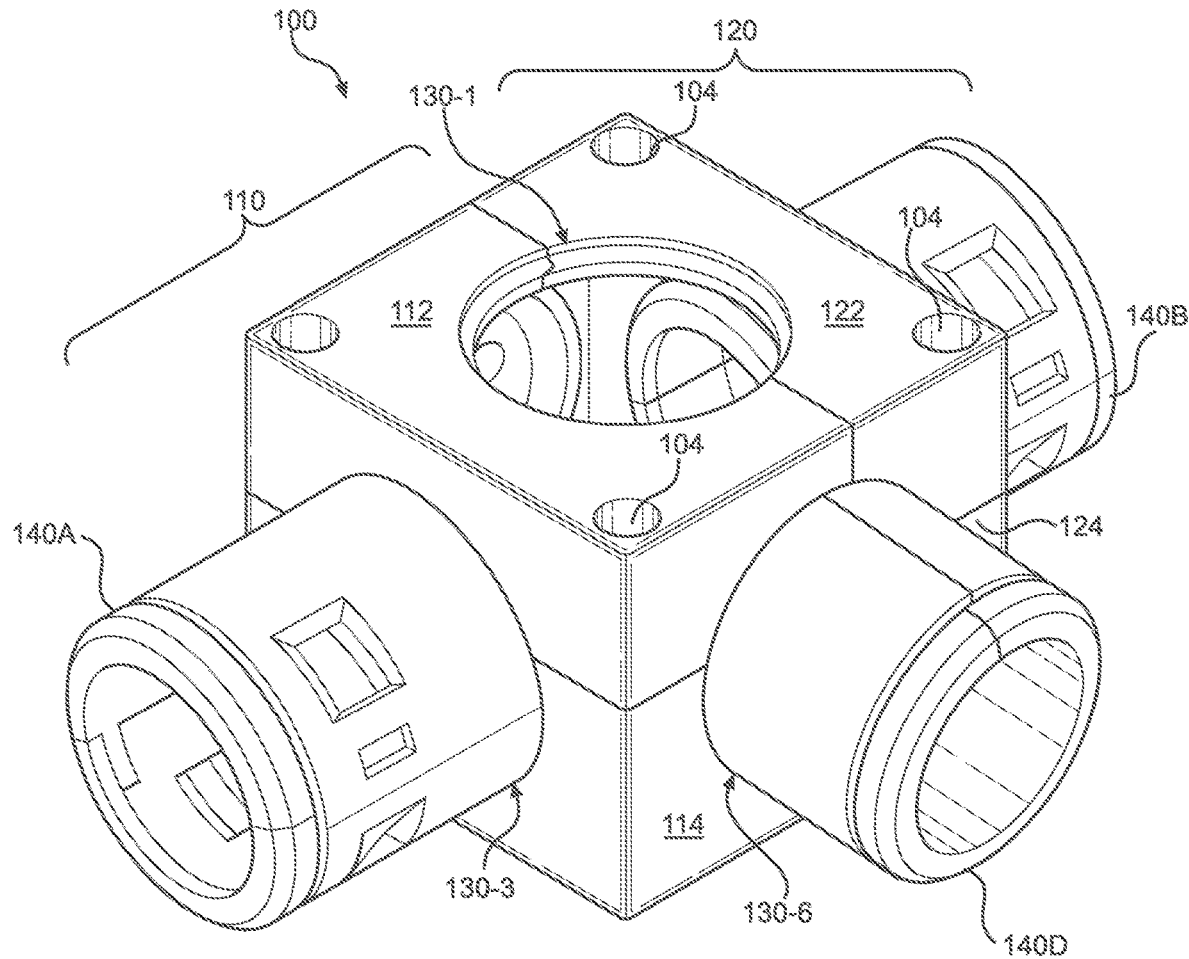
FIG. 1A, FIG. 1B, FIG. 1C, FIG. 1D, FIG. 1E, FIG. 1F, FIG. 1G, FIG. 1H, FIG. 1I, FIG. 1J, and FIG. 1K are perspective, top, bottom, front, back, left side, right side, assembly, partial assembly, perspective cross-section, and cross-sectional views of a modular junction box according to some embodiments.
Figure 1B:
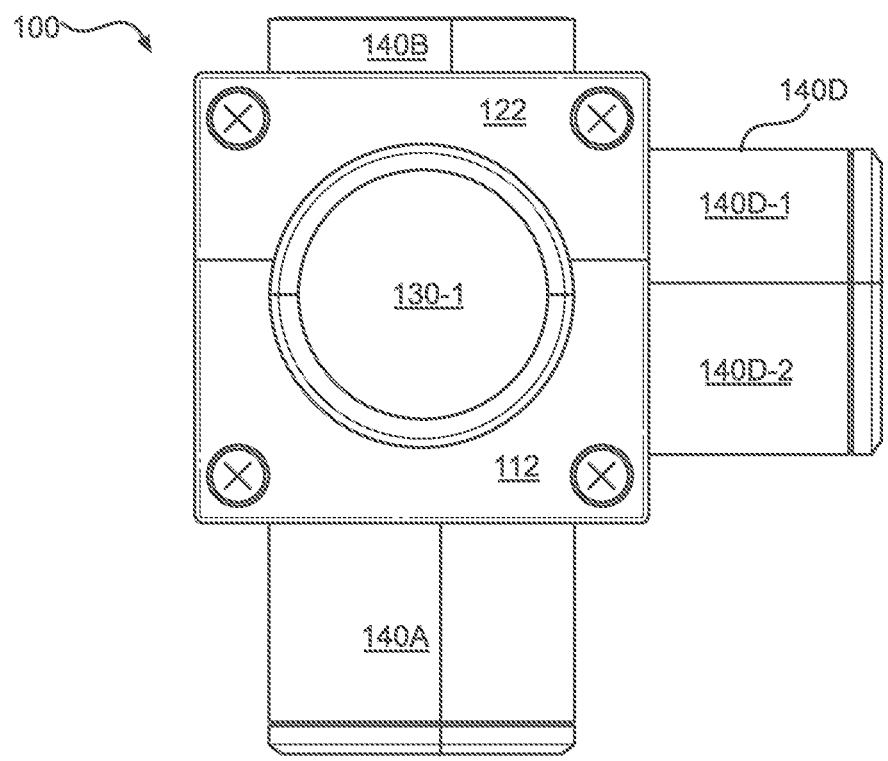
Figure 1C:
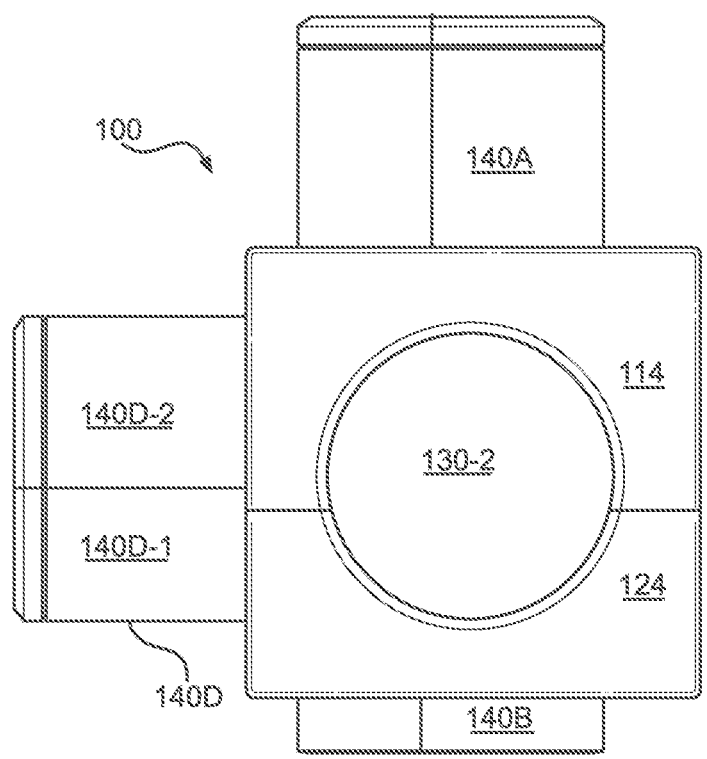
Figure 1D:
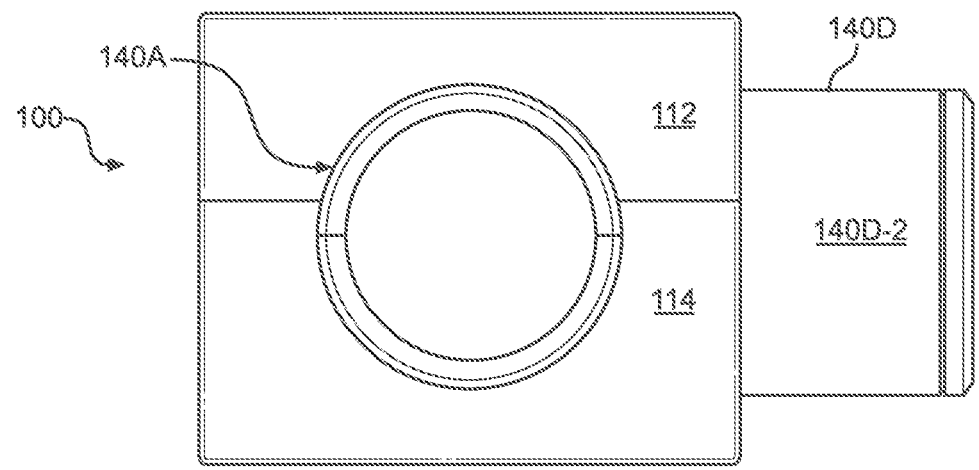
Figure 1E:
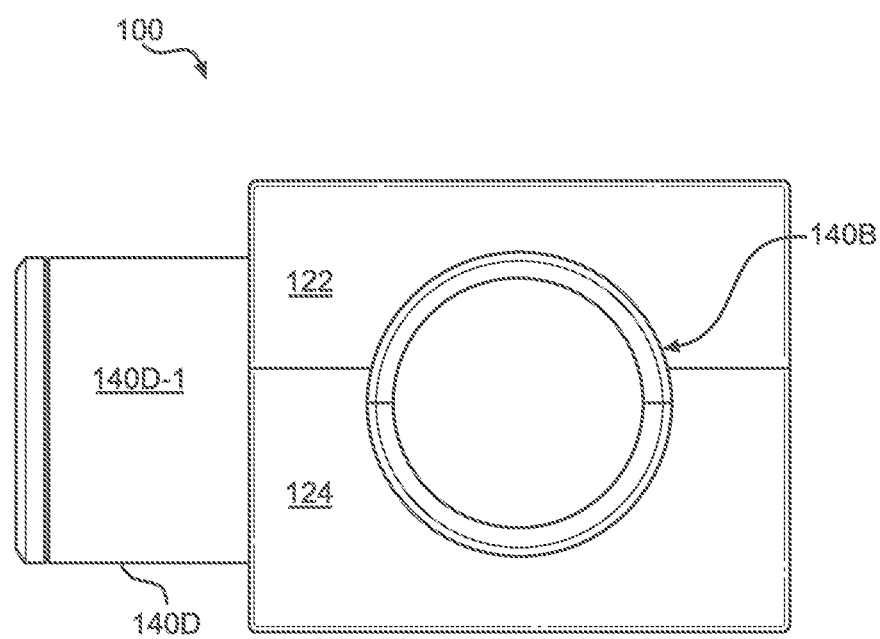
Figure 1F:
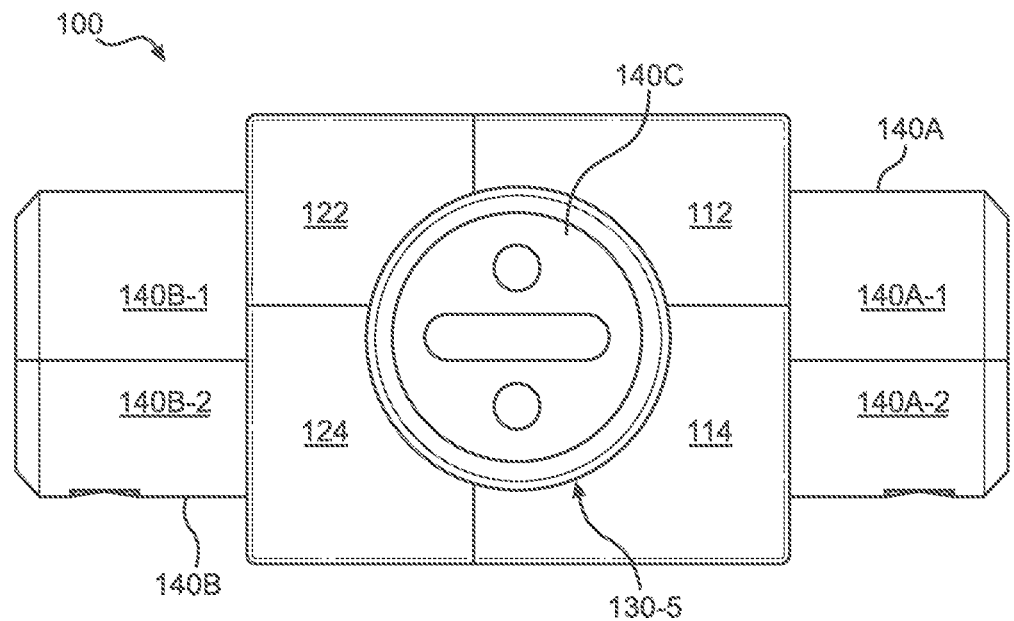
Figure 1G:
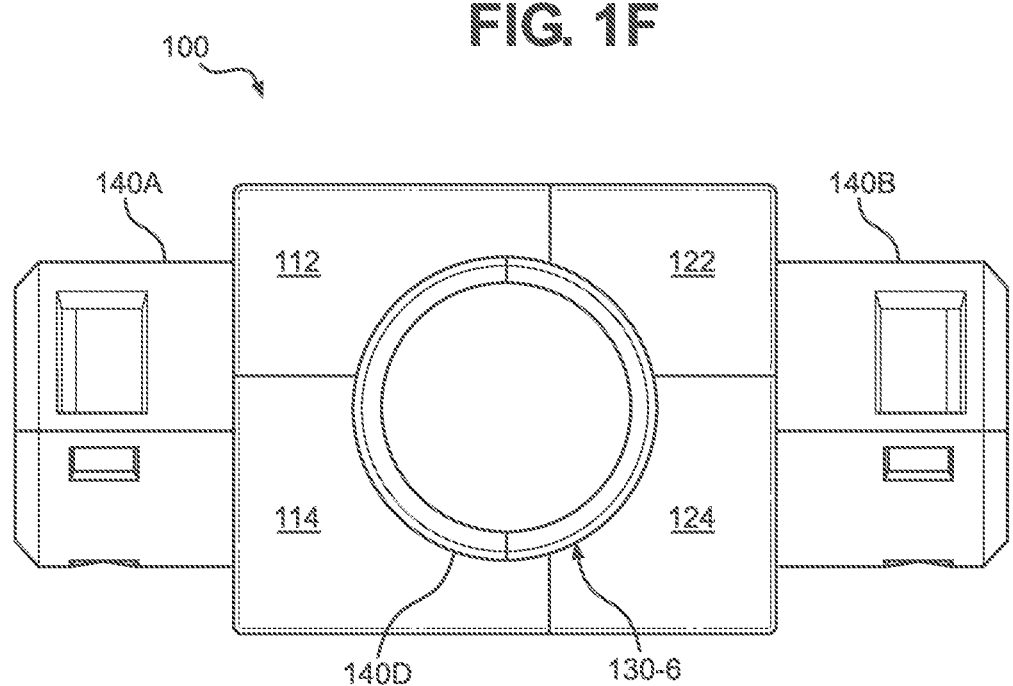

Embodiments presented herein are descriptive of systems, apparatus, methods, and articles of manufacture for modular junction boxes. In some embodiments, a modular junction box may be assembled from a plurality of sub-components or portions that are selectively and removably coupled to one another to form various ports through which cables, pipes, and/or other desired objects may be routed. According to some embodiments, some or all of the coupling and/or mating elements may be secured in place by one or more modular port adapters installed in the various ports. In such a manner, for example, the modular junction box may (i) be easily customized for various types of installations, (ii) reduce the quantity of necessary non-integral fasteners (e.g., reducing cost, potential component loss, and/or reducing installation/maintenance times), and/or (iii) provide a reliably joined structural component (e.g., that reduces repairs or malfunctions).

Typical modular junction boxes are often only modular in the sense that they are assembled in two parts—typically a top and a bottom. Whether utilized for electrical wire installations (high or low voltage), plumbing, or drainage, such removable-top boxes (e.g., catch basins in the case of a drainage installation) define circular ports on their sides and have a removable lid to provide access to the inside of the box, e.g., where any wires, pipes, and/or other objects are terminated, joined, split, etc. Some junction boxes comprise pre-cut ports of a particular size while others comprise multiple ports of various sizes (e.g., giving the installer a choice of which size conduit to utilize) and/or variously sized knockouts (e.g., pre-defined sections of the walls that are scored at the perimeter to allow for selective punching out and/or removal).

These previous junction boxes offer limited flexibility for the installer, however, as each box includes a maximum number of ports/knockouts and the boxes are a predefined size (usually sized for a specific application such as to fit between typically framing studs in a wall of a residential building). Attempts to provide for more modular junction boxes have typically resulted in boxes that are less rigid, require complex non-integral fasteners, and/or are prone to unintended opening or disassembly.

Embodiments for modular junction boxes presented herein solve these and other deficiencies of previous junction box designs, allowing for increased flexibility with respect to installation options (and uses), simple and reliable integrated modular interlocking, a high degree of rigidity, and a greatly decreased likelihood of unintended disassembly. In some embodiments, for example, the modular junction box may comprise a plurality of interlocking male and female elements or portions that are held together by latching mechanism that themselves are retained (and/or restrained) by installed modular port adapters. In some embodiments, the ports may be distributed across various elements or portions of the junction box and/or may be partially defined by such multiple portions. Each port may, for example, be partially formed on or by a first element (e.g., a female element) and partially formed on or by a second element (e.g., a male element) such that a portion of the port is defined by each respective element. According to some embodiments, the ratio of the portioning of the port between the elements may be designed to permit modular port adapters to be held in place in the case it is joined to the first element alone (e.g., providing for a more user-friendly assembly process). These and other advantageous features of the modular junction boxes provided herein may be more fully comprehended in light of the following detailed description, with reference to the various accompanying drawings.

II. Modular Junction Box

Turning initially to FIG. 1A, FIG. 1B, FIG. 1C, FIG. 1D, FIG. 1E, FIG. 1F, FIG. 1G, FIG. 1H, FIG. 1I, FIG. 1J, and FIG. 1K, perspective, top, bottom, front, back, left side, right side, assembly, partial assembly, perspective cross-section, and cross-sectional views of a modular junction box 100 according to some embodiments are shown. The modular junction box 100 may comprise, for example, a plurality of fasteners 102 (depicted in FIG. 1H) engaged with one or more upper fastening features 104 and/or one or more lower and/or corresponding fastening features 106 to form, couple, and/or secure a first or female portion or component 110 and/or portions or elements thereof. The fasteners 102 may, for example, selectively and/or removably couple a first or upper female portion 112 (e.g., comprising and/or defining outer and inner top surfaces 112-1A, 112-1B, outer and inner front surfaces 112-3A, 112-3B, outer and inner left surfaces 112-5A, 112-5B, and/or outer and inner right surfaces 112-6A, 112-6B) to a second or lower female portion 114 (e.g., comprising and/or defining outer and inner bottom surfaces 114-2A, 114-2B, outer and inner front surfaces 114-3A, 114-3B, outer and inner left surfaces 114-5A, 114-5B, and/or outer and inner right surfaces 114-6A, 114-6B).

In some embodiments (as depicted), the various outer surfaces 112-1A, 112-3A, 112-5A, 112-6A, 114-2A, 114-3A, 114-5A, 114-6A may be arranged rectilinearly such that each surface 112-1A, 112-3A, 112-5A, 112-6A, 114-2A, 114-3A, 114-5A, 114-6A is disposed in a plane that is normal to an adjacent surface 112-1A, 112-3A, 112-5A, 112-6A, 114-2A, 114-3A, 114-5A, 114-6A. According to some embodiments, in the case that the upper female portion 112 is coupled, mated, joined, and/or oriented with the lower female portion 114 (e.g., to form the female component 110): (i) the outer top surface 112-1A may be disposed in a first plane parallel to a second plane in which the outer bottom surface 114-2A is disposed, (ii) the outer front surface 112-3A, 114-3A may be disposed in a third plane that is normal to the first and second planes, (iii) the outer left surfaces 112-5A, 114-5A may be disposed in a fourth plane parallel to a fifth plane in which the outer right surfaces 112-6A, 114-6A are disposed, and (iv) the fourth and fifth planes may be normal to each of the first, second, and third planes.

Figure 1H:
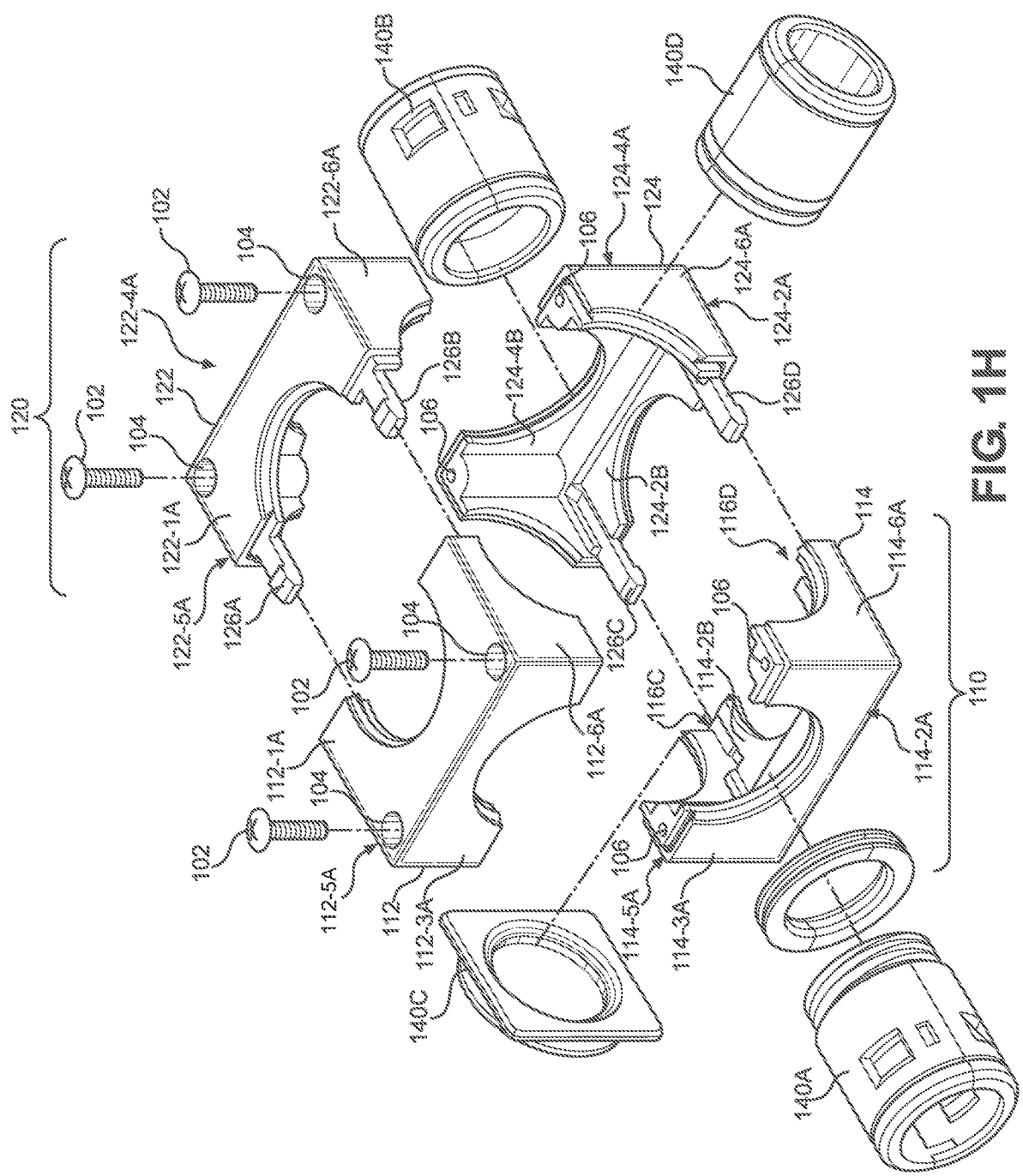
Figure 1I:
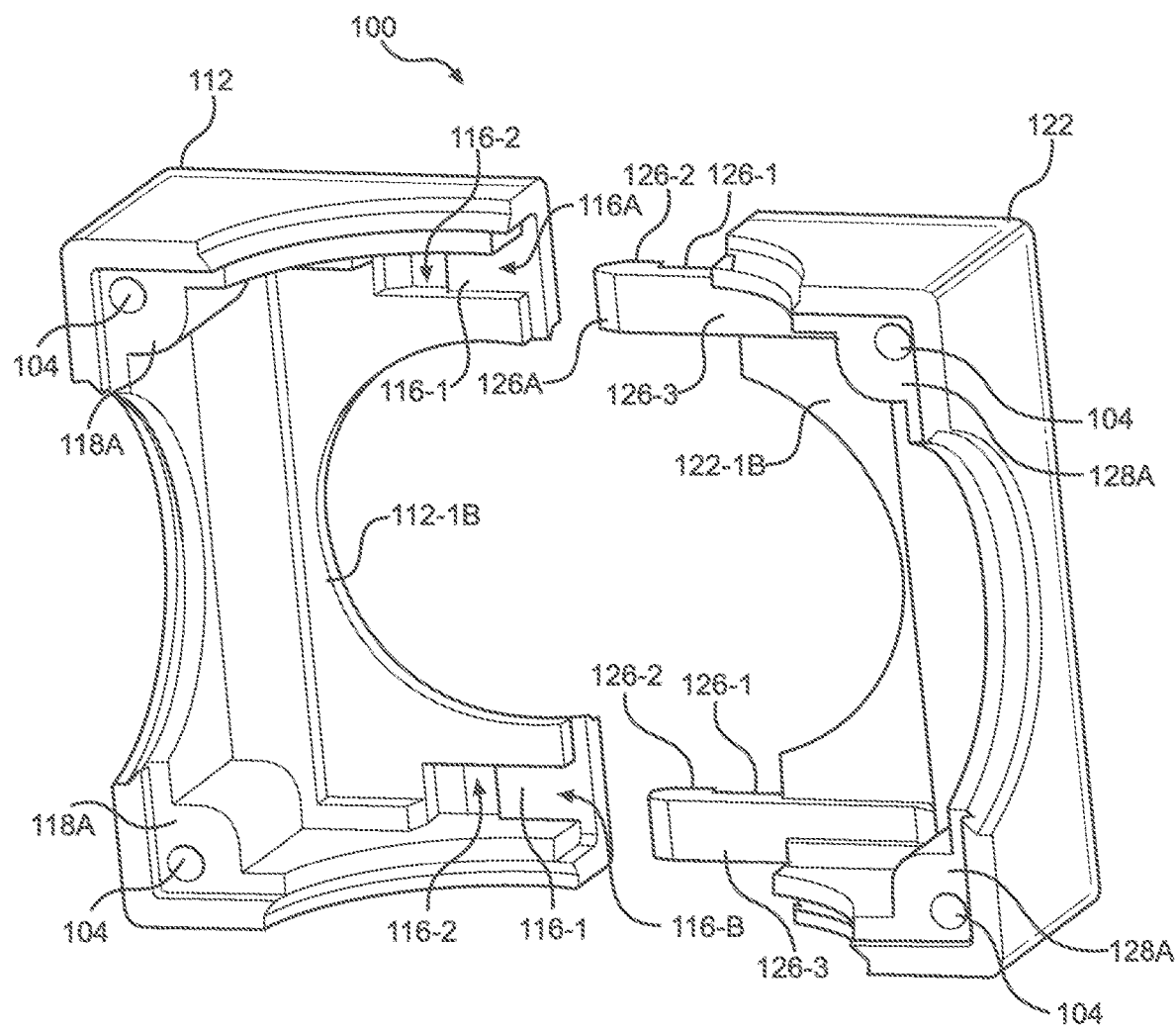

According to some embodiments, and as depicted in FIG. 1H and FIG. 1I, each of the upper female portion 112 and the lower female portion 114 may comprise and/or define mating slots 116A-D formed, respectively, in or on the inner top surface 112-1B and the inner bottom surface 114-2B. In some embodiments, the mating slots 116A-D may comprise (and as depicted and numbered in FIG. 1I) a primary channel or recess 116-1 and/or a secondary channel or recess 116-2. The primary recess 116-1 may comprise, for example, a cut, groove, channel, indentation, and/or other feature formed and/or otherwise disposed on the inner top surface 112-1B and the inner bottom surface 114-2B. In some embodiments, the primary recess 116-1 may comprise a slot that extends from a first, proximal, or entry end at a terminus of the respective upper female portion 112 and the lower female portion 114 to a second, distal, or stop end at a certain distance from the first end—e.g., defining a length of the primary recess 116-1. According to some embodiments, the primary recess 116-1 may comprise and/or define a first depth that may, for example, range between one millimeter (1 mm) to a thickness of the respective upper female portion 112 and the lower female portion 114 minus one millimeter (1 mm). In some embodiments, the primary recess 116-1 may comprise and/or define portions of varying depth of any practicable magnitude (e.g., zero (0) to the complete thickness of the respective upper female portion 112 and the lower female portion 114).

In some embodiments, the secondary recess 116-2 may comprise and/or define a portion of the primary recess 116-1 that varies in one or more dimensions from the primary recess 116-1. The secondary recess 116-2 may comprise, for example, a portion of the length of the primary recess 116-1 that comprises and/or defines a second depth that is greater than or less than the first depth. According to some embodiments (such as depicted in FIG. 1I), the second depth may be greater than the first depth such that the secondary recess 116-2 forms a depression within the primary recess 116-1 (e.g., extends the overall depth of the primary recess 116-1 at the location of the secondary recess 116-2. In some embodiments, the secondary recess 116-2 may be formed with a size, shape, and/or other geometry configured for cooperative mating with one or more other elements (not shown).

Figure 1J:
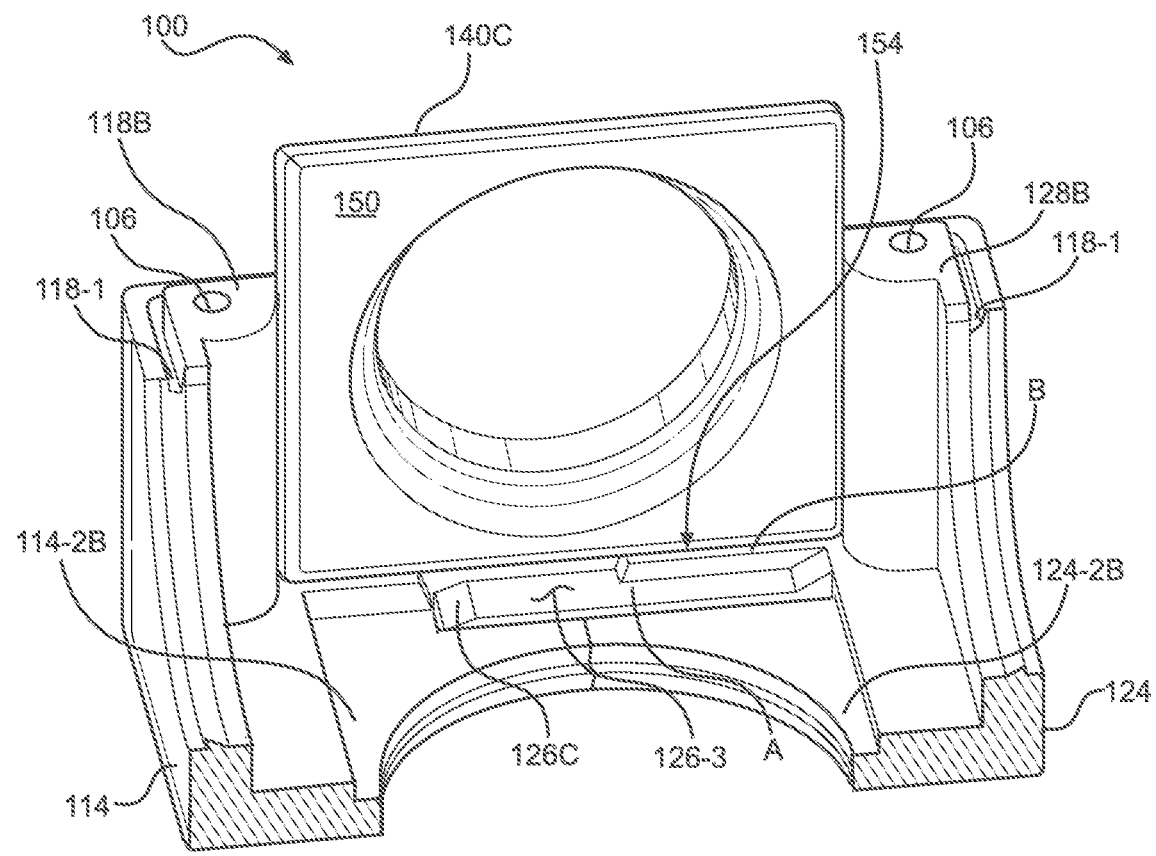

According to some embodiments, the upper female portion 112 may comprise and/or define one or more first or recessed mating surfaces 118A that are sized and/or shaped to couple, seat, and/or mate with corresponding second or projected mating surfaces 118B of the lower female portion 114. In some embodiments, and as depicted in FIG. 1H, FIG. 1I, and FIG. 1J, the recessed mating surfaces 118A and the projected mating surfaces 118B may comprise, define, and/or be oriented with the upper and lower fastening features 104, 106. In the non-limiting example case (depicted in FIG. 1H) of the upper and lower fastening features 104, 106 comprising holes and the fasteners 102 comprising screws, for example, the screw hole upper fastening feature 104 may be disposed through the outer top surface 112-1A of the upper female portion 112 and extend through to the recessed mating surfaces 118A thereof. Similarly, the screw hole lower fastening feature 106 may be disposed through the projected mating surfaces 118B of the lower female portion 114 and extend into the lower female portion 114 toward the outer bottom surface 114-2A thereof. In such a manner, for example, the screw fasteners 102 may extend through the upper female portion 112 and into the lower female portion 114 through the axially aligned screw hole upper fastening features 104 and screw hole lower fastening features 106, with the joint between the upper female portion 112 and the lower female portion 114 being strengthened by the seating and/or mating of the respective recessed mating surfaces 118A and projected mating surfaces 118B. According to some embodiments, a gasket seat 118-1 may be provided (e.g., as shown in FIG. 1J) that permits installation of a gasket, ring, and/or seal (not shown) that provides a watertight and/or dustproof sealing of the modular junction box 100 (e.g., in the case that all ports 130 are sealed by respective adapters 140.

In some embodiments, the fasteners 102 may be engaged with the one or more upper fastening features 104 and/or the one or more lower and/or corresponding fastening features 106 to form, couple, and/or secure a second or male portion or component 120 and/or portions or elements thereof. The fasteners 102 may, for example, selectively and/or removably couple a first or upper male portion 122 (e.g., comprising and/or defining outer and inner top surfaces 122-1A, 122-1B, outer and inner back surfaces 122-4A, 122-4B, outer and inner left surfaces 122-5A, 122-5B, and/or outer and inner right surfaces 122-6A, 122-6B) to a second or lower male portion 124 (e.g., comprising and/or defining outer and inner bottom surfaces 124-2A, 124-2B, outer and inner back surfaces 124-4A, 124-4B, outer and inner left surfaces 124-5A, 124-5B, and/or outer and inner right surfaces 124-6A, 124-6B).

In some embodiments (as depicted), the various outer surfaces 122-1A, 122-4A, 122-5A, 122-6A, 124-2A, 124-4A, 124-5A, 124-6A may be arranged rectilinearly such that each surface 122-1A, 122-4A, 122-5A, 122-6A, 124-2A, 124-4A, 124-5A, 124-6A is disposed in a plane that is normal to an adjacent surface 122-1A, 122-4A, 122-5A, 122-6A, 124-2A, 124-4A, 124-5A, 124-6A. According to some embodiments, in the case that the upper male portion 122 is coupled, mated, joined, and/or oriented with the lower male portion 124: (i) the outer top surface 122-1A may be disposed in the first plane parallel to the second plane in which the outer bottom surface 124-2A is disposed, (ii) the outer back surfaces 122-4A, 124-4A may be disposed in a sixth plane that is normal to the first and second planes, (iii) the outer left surfaces 122-5A, 124-5A may be disposed in the fourth plane parallel to the fifth plane in which the outer right surfaces 122-6A, 124-6A are disposed, and (iv) the fourth and fifth planes may be normal to each of the first, second, and sixth planes.

According to some embodiments, and as depicted in FIG. 1H and FIG. 1I, each of the upper male portion 122 and the lower male portion 124 may comprise and/or define mating or latch arms 126A-D formed and/or coupled, respectively, in, to, or on the inner top surface 122-1B and the inner bottom surface 124-2B. In some embodiments, the latch arms 126A-D may comprise (and as depicted and numbered in FIG. 1I) elongated projections defining a primary latching surface 126-1, a secondary latching surface 126-2, and/or a latch arm back surface 126-3. In some embodiments, the latch arms 126A-D may extend from the respective upper male portion 122 and the lower male portion 124 along or in parallel with the respective first and second planes. First and second latch arms 126A-B (and/or the respective latch arm back surfaces 126-3 thereof) may extend from and/or be coplanar with the inner top surface 122-1B of the upper male portion 122, for example, and/or third and fourth latch arms 126C-D (and/or the respective latch arm back surfaces 126-3 thereof) may extend from and/or be coplanar with the inner bottom surface 124-2B of the lower male portion 124. In some embodiments, the latch arms 126A-D may be sized and/or shaped to seat, mate, and/or couple with respective mating slots 116A-D of the female component 110. The length and/or width of the latch arms 126A-D may be sized and/or shaped, for example, to fit within the corresponding primary recesses 116-1.

According to some embodiments, the primary latching surfaces 126-1 may be configured to seat, mate, and/or couple with the corresponding primary recesses 116-1 and the secondary latching surfaces 126-2 may be configured to seat, mate, and/or couple with the corresponding secondary recesses 116-2. In the case that the secondary latching surfaces 126-2 comprise projections (e.g., outward projections as depicted) and the secondary recesses 116-2 comprises and/or defines a latching receptacle or feature, engagement of the secondary latching surfaces 126-2 with the secondary recesses 116-2 may prevent axial or planar disengagement of mated female portions 112, 114 and respectively mated male portions 122, 124. According to some embodiments, the latch arms 126A-D may be configured to be elastically pliable such that they may be selectively bent inwardly from their respective planes to disengage the secondary latching surfaces 126-2 with the secondary recesses 116-2, thereby selectively decoupling the mated female portions 112, 114 and respectively mated male portions 122, 124.

In some embodiments, the latch arms 126A-D may comprise and/or define a first thickness between the primary latching surfaces 126-1 and the latch arm back surfaces 126-3 and/or may comprise and/or define a second thickness between the secondary latching surfaces 126-2 and the latch arm back surfaces 126-3. According to some embodiments, the first and second thicknesses may be configured such that in the case that the latch arms 126A-D are seated in and/or coupled to the corresponding mating slots 116A-D, the latch arm back surfaces 126-3 are disposed coplanar and/or flush with the respective inner top surfaces 112-1B and inner bottom surfaces 114-2B. The first thickness of the latch arms 126A-D may be equivalent to the first depth of the primary recess 116-1, for example, and/or the second thickness of the latch arms 126A-D may be equivalent to the second depth of the secondary recess 116-2. In some embodiments, the latch arms 126A-D may be otherwise formed with a size, shape, and/or other geometry to match and/or be cooperative with the geometry of the mating slots 116A-D.

According to some embodiments, the upper male portion 122 may comprise and/or define one or more first or recessed mating surfaces 128A that are sized and/or shaped to couple, seat, and/or mate with corresponding second or projected mating surfaces 128B of the lower male portion 124. In some embodiments, and as depicted in FIG. 1H, FIG. 1I, and FIG. 1J, the recessed mating surfaces 128A and the projected mating surfaces 128B may comprise, define, and/or be oriented with the upper and lower fastening features 104, 106. In the non-limiting example case (depicted in FIG. 1H) of the upper and lower fastening features 104, 106 comprising holes and the fasteners 102 comprising screws, for example, the screw hole upper fastening feature 104 may be disposed through the outer top surface 122-1A of the upper male portion 122 and extend through to the recessed mating surfaces 128A thereof. Similarly, the screw hole lower fastening feature 106 may be disposed through the projected mating surfaces 128B of the lower male portion 124 and extend into the lower male portion 124 toward the outer bottom surface 124-2A thereof. In such a manner, for example, the screw fasteners 102 may extend through the upper male portion 122 and into the lower male portion 124 through the axially aligned screw hole upper fastening features 104 and screw hole lower fastening features 106, with the joint between the upper male portion 122 and the lower male portion 124 being strengthened by the seating and/or mating of the respective recessed mating surfaces 128A and projected mating surfaces 128B.

In some embodiments, the modular junction box 100 may comprise and/or define a plurality of ports 130, e.g., cut, formed, and/or otherwise disposed in or through one or more of the various surfaces 112-1A-B, 112-3A-B, 112-5A-B, 112-6A-B, 114-2A-B, 114-3A-B, 114-5A-B, 114-6A-B, 122-1A-B, 122-4A-B, 122-5A-B, 122-6A-B, 124-2A-B, 124-4A-B, 124-5A-B, 124-6A-B (e.g., each port 130 comprising and/or defining a lip, inner terminus, and/or inner edge 132). In the case that the modular junction box 100 comprises a six (6)-sided square or rectangular box shape (as depicted for non-limiting purposes of example), the modular junction box 100 may comprise and/or define a top port 130-1, a bottom port 130-2, a front port 130-3, a back port 130-4, a left port 130-5, and/or a right port 130-6. While the ports 130 are depicted as having the same or similar diameters, the size, shape, and/or quantity of the ports 130 may be increased or decreased and/or may vary amongst or between the various surfaces 112-1A-B, 112-3A-B, 112-5A-B, 112-6A-B, 114-2A-B, 114-3A-B, 114-5A-B, 114-6A-B, 122-1A-B, 122-4A-B, 122-5A-B, 122-6A-B, 124-2A-B, 124-4A-B, 124-5A-B, 124-6A-B. Due to the modular assembly of the modular junction box 100, any given port 130 may be formed by a combination of two (2) to four (4) portions 112, 114, 122, 124. The top port 130-1 may be formed by and/or between the upper female portion 112 and the upper male portion 122, for example, and/or the right port 130-6 may be formed by and/or between the upper female portion 112, the lower female portion 114, the upper male portion 122, and the lower male portion 124.

According to some embodiments, a fitting or modular adapter 140A-D may be coupled to and/or retained by one or more of the ports 130. As depicted for purposes of non-limiting example, the front port 130-3 may be coupled to a first adapter 140A, the back port 130-4 may be coupled to a second adapter 140b, the left port 130-5 may be coupled to a third adapter 140c, and/or the right port 130-6 may be coupled to a fourth adapter 140D. In some embodiments, as shown with respect to the top port 130-1 and the bottom port 130-2, one or more of the ports 130 may not be coupled to an adapter 140A-D. According to some embodiments, the adapters 140A-D may comprise any type, configuration, and/or size or shape of fitting, adapter, coupling, and/or other object that is desired (e.g., for connecting one or more conduits, pipes, housings, fittings, and/or materials (e.g., bundled cables)). In some embodiments, one or more of the adapters 140A-D may themselves be modular such as by comprising first adapter portions 140A-1, 140B-1, 140D-1 and/or second adapter portions 140A-2, 140B-2, 140D-2. Any or all of the adapters 140A-D may, for example, be split longitudinally or axially into the first adapter portions 140A-1, 140B-1, 140D-1 and/or second adapter portions 140A-2, 140B-2, 140D-2. The first adapter portions 140A-1, 140B-1, 140D-1 and/or second adapter portions 140A-2, 140B-2, 140D-2 may be coupled, for example, to form the adapters 140A-D and/or may be uncoupled to deconstruct or disassemble the adapters 140A-D, e.g., for storage, shipping, etc. In some embodiments, coupling of the adapters 140A-D to their respective ports 130 may cause the first adapter portions 140A-1, 140B-1, 140D-1 and/or second adapter portions 140A-2, 140B-2, 140D-2 to be maintained in a coupled, joined, and/or abutted state. Deconstruction/disassembly of the modular junction box 100 to deconstruct a port 130 and/or removal of an adapter 140A-D from a port 130 may, for example, remove a radial pressure or radial stop limit from the adapters 140A-D, thereby causing or permitting the first adapter portions 140A-1, 140B-1, 140D-1 and/or second adapter portions 140A-2, 140B-2, 140D-2 to become uncoupled.

Figure 1K:
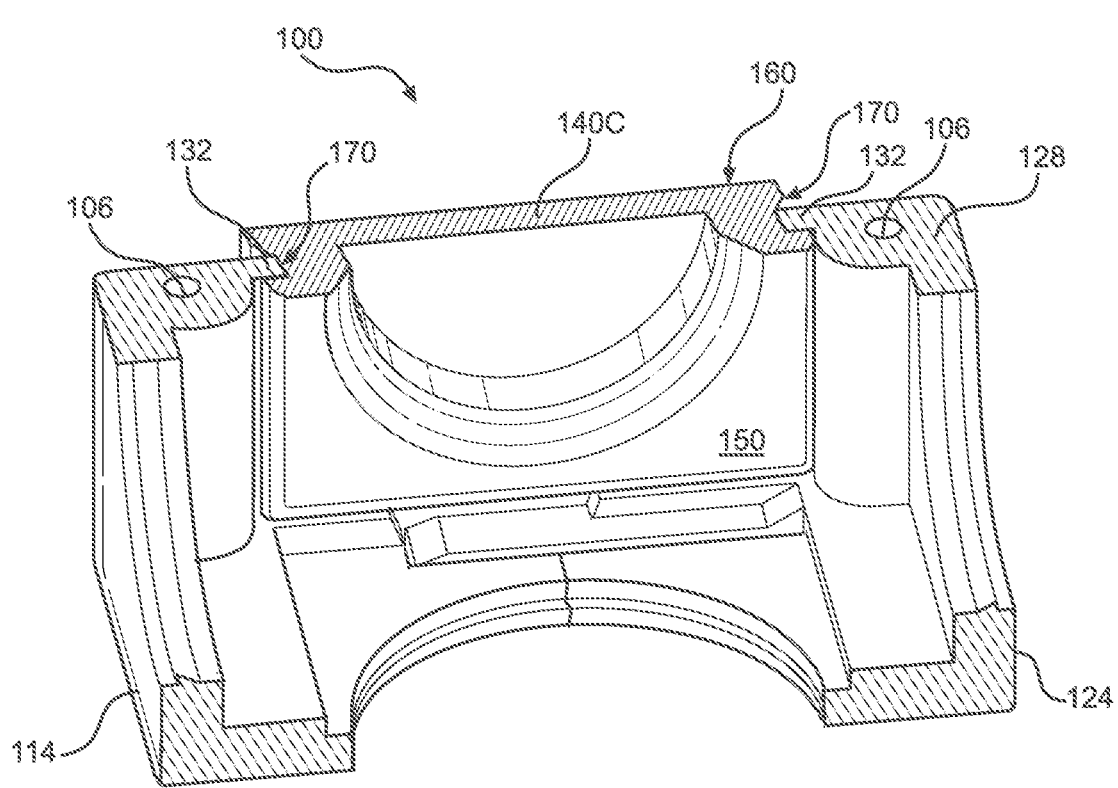

According to some embodiments, and as depicted in FIG. 1J and FIG. 1K, an adapter 140A-D such as a third adapter 140C (shown as a blank or plug for purposes of non-limiting example) may be advantageously coupled to and/or housed by the modular junction box 100 in a manner that provides coupling integrity. With respect to a third latch arm 126C that couples the lower female portion 114 to the lower male portion 124, for example, a retaining element such as a mounting flange 150 of the third adapter 140C may be disposed to prevent uncoupling of the third latch arm 126C from the lower female portion 114. In some embodiments, a third back surface 126C-3 of the third latch arm 126C may be disposed in one or more of a first latching plane "A" and a second latching plane "B". According to some embodiments, the first latching plane "A" may be equivalent to or parallel to the second plane of the modular junction box 100 and/or may be coplanar with the inner bottom surfaces 114-2B, 124-2B of the respective (and coupled) lower female portion 114 and lower male portion 124. In some embodiments, the first latching plane "A" may be disposed at a first or lower elevation (with respect to the third adapter 140C (and/or the mounting flange 150 thereof) and/or the second latching plane "B" may be disposed at a second or higher elevation. As depicted in FIG. 1J and FIG. 1K for example, at least a portion of the third back surface 126C-3 of the third latch arm 126C may be disposed in the second latching plane "B" such that an edge 154 of the mounting flange 150 rests thereon and/or otherwise mates, contacts, and/or couples thereto. In such a manner, for example, the third back surface 126C-3 of the third latch arm 126C may be restrained by the edge 154 of the mounting flange 150, thereby preventing decoupling of the lower female portion 114 and the lower male portion 124 in the case that the third adapter 140C is coupled to the modular junction box 100.

According to some embodiments, less or more of the third back surface 126C-3 may be disposed in the second latching plane "B" and/or the mounting flange 150 (and/or the edge 154 thereof) may comprise a tab or other protrusion (not shown) that extends to one or more portions of the third back surface 126C-3 disposed in the first latching plane "A". It should be understood that the edge 154 may not necessarily be in contact with the third back surface 126C-3, in some embodiments, but may nonetheless limit the range of motion of the third latch arm 126C such that decoupling of the lower female portion 114 and the lower male portion 124 is prevented.

In some embodiments, and as depicted in FIG. 1K, the third adapter 140C may be retained by the modular junction box 100 such that the mounting flange 150 is disposed inside of the modular junction box 100 and such that a connecting element 160 is disposed external to and/or flush with the outside of the modular junction box 100. According to some embodiments, the third adapter 140C may be retained and/or coupled to the modular junction box 100 (and/or at least the lower female portion 114 and the lower male portion 124 thereof) by engagement of the inner edge 132 of any given port 130 with a mounting channel 170 of the third adapter 140C. In such a manner, for example, in the case that the third adapter 140C (or any other adapter 140A-B, 140D) is mated with the modular junction box 100 and the modular junction box 100 is itself assembled, the edge 154 of the third adapter 140C may prevent disengagement of the third latch arm 126C, and thereby provide enhanced coupling integrity to the modular junction box 100. As the utilization of the latch arms 126A-D and the corresponding mating slots 116A-D permit the modular junction box 100 to be at least partially assembled without requiring any non-integral fasteners (such as the fasteners 102), the configuration of the mounting flange 150 of the adapters 140A-D may accordingly permit such an integral fastener arrangement with the security that would otherwise require additional and/or non-integral parts to achieve.

While various sizes, quantities, dimensions, and/or proportions of various elements and/or features of the modular junction box 100 are described and/or depicted, in some embodiments different sizes, quantities, dimensions, and/or proportions of the various elements may be utilized. Similarly, mating and/or other cooperative and/or corresponding elements may be reversed in some embodiments. While certain elements and/or portions are described and depicted as comprising the latch arms 126A-D or the projected mating surfaces 118B, 128B and others as comprising the corresponding mating slots 116A-D or recessed mating surfaces 118A, 128A, for example, the elements, arms, slots, and/or surfaces may be reversed in some embodiments, without altering the overall functionality of the modular junction box 100

In some embodiments, any or all of the components 102, 104, 106, 110, 112, 112-1A, 112-1B, 112-3A, 112-3B, 112-5A, 112-5B, 112-6A, 112-6B, 114, 114-2A, 114-2B, 114-3A, 114-3B, 114-5A, 114-5B, 114-6A, 114-6B, 116A-D, 116-1, 116-2, 118A, 118B, 120, 122, 122-1A, 122-1B, 122-4A, 122-4B, 122-5A, 122-5B, 122-6A, 122-6b, 124, 124-2A, 124-2B, 124-4A, 124-4B, 124-5A, 124-5B, 124-6A, 124-6B, 126A-D, 126-1, 126-2, 126-3, 126C-3, 128A, 128B, 130, 130-1, 130-2, 130-3, 130-4, 130-5, 130-6, 132, 140A-D, 140A-1, 140B-1, 140D-1, 140A-2, 140B-2, 140D-2, 150, 154, 170 of the modular junction box 100 may be similar in configuration and/or functionality to any similarly named and/or numbered components described herein. Fewer or more components 102, 104, 106, 110, 112, 112-1A, 112-1B,

112-3A, 112-3B, 112-5A, 112-5B, 112-6A, 112-6B, 114, 114-2A, 114-2B, 114-3A, 114-3B, 114-5A, 114-5B, 114-6A, 114-6B, 116A-D, 116-1, 116-2, 118A, 118B, 120, 122, 122-1A, 122-1B, 122-4A, 122-4B, 122-5A, 122-5B, 122-6A, 122-6*b*, 124, 124-2A, 124-2B, 124-4A, 124-4B, 124-5A, 124-5B, 124-6A, 124-6B, 126A-D, 126-1, 126-2, 126-3, 126C-3, 128A, 128B, 130, 130-1, 130-2, 130-3, 130-4, 130-5, 130-6, 132, 140A-D, 140A-1, 140B-1, 140D-1, 140A-2, 140B-2, 140D-2, 150, 154, 170 (and/or portions thereof) and/or various configurations of the components 102, 104, 106, 110, 112, 112-1A, 112-1B, 112-3A, 112-3B, 112-5A, 112-5B, 112-6A, 112-6B, 114, 114-2A, 114-2B, 114-3A, 114-3B, 114-5A, 114-5B, 114-6A, 114-6B, 116A-D, 116-1, 116-2, 118A, 118B, 120, 122, 122-1A, 122-1B, 122-4A, 122-4B, 122-5A, 122-5B, 122-6A, 122-6*b*, 124, 124-2A, 124-2B, 124-4A, 124-4B, 124-5A, 124-5B, 124-6A, 124-6B, 126A-D, 126-1, 126-2, 126-3, 126C-3, 128A, 128B, 130, 130-1, 130-2, 130-3, 130-4, 130-5, 130-6, 132, 140A-D, 140A-1, 140B-1, 140D-1, 140A-2, 140B-2, 140D-2, 150, 154, 170 may be included in the modular junction box 100 without deviating from the scope of embodiments described herein. In some embodiments, one or more of the various components 102, 104, 106, 110, 112, 112-1A, 112-1B, 112-3A, 112-3B, 112-5A, 112-5B, 112-6A, 112-6B, 114, 114-2A, 114-2B, 114-3A, 114-3B, 114-5A, 114-5B, 114-6A, 114-6B, 116A-D, 116-1, 116-2, 118A, 118B, 120, 122, 122-1A, 122-1B, 122-4A, 122-4B, 122-5A, 122-5B, 122-6A, 122-6*b*, 124, 124-2A, 124-2B, 124-4A, 124-4B, 124-5A, 124-5B, 124-6A, 124-6B, 126A-D, 126-1, 126-2, 126-3, 126C-3, 128A, 128B, 130, 130-1, 130-2, 130-3, 130-4, 130-5, 130-6, 132, 140A-D, 140A-1, 140B-1, 140D-1, 140A-2, 140B-2, 140D-2, 150, 154, 170 may not be needed and/or desired in the modular junction box 100.

III. Modular Junction Box Components

Figure 2A:
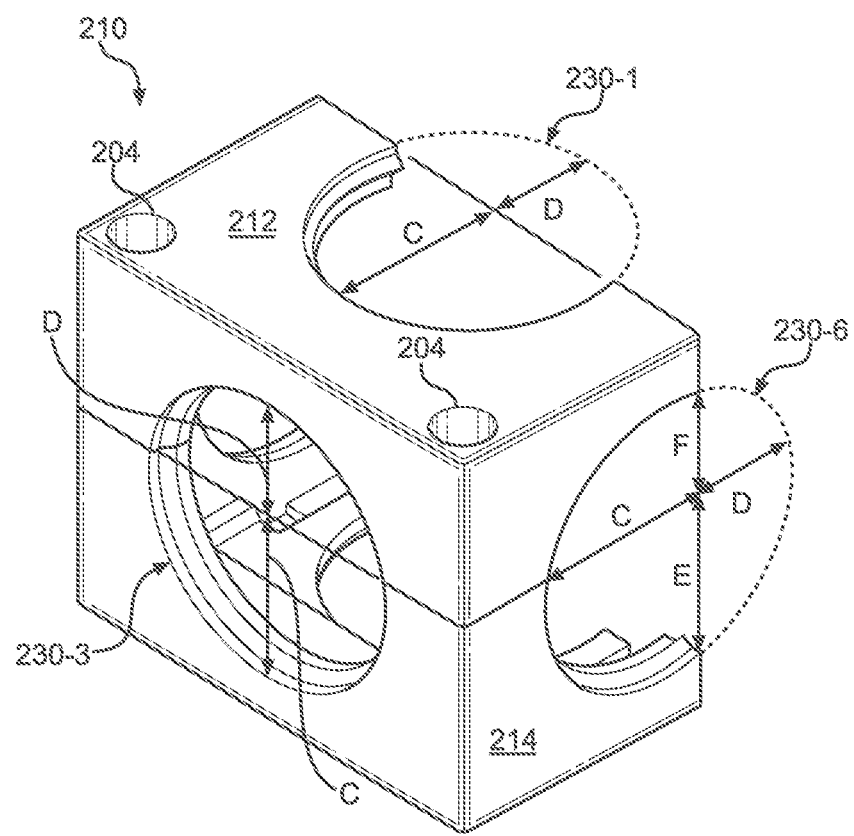
FIG. 2A, FIG. 2B, FIG. 2C, and FIG. 2D are perspective, perspective assembly, upper perspective, and lower perspective views of a female portion of a modular junction box according to some embodiments.
Figure 2B:
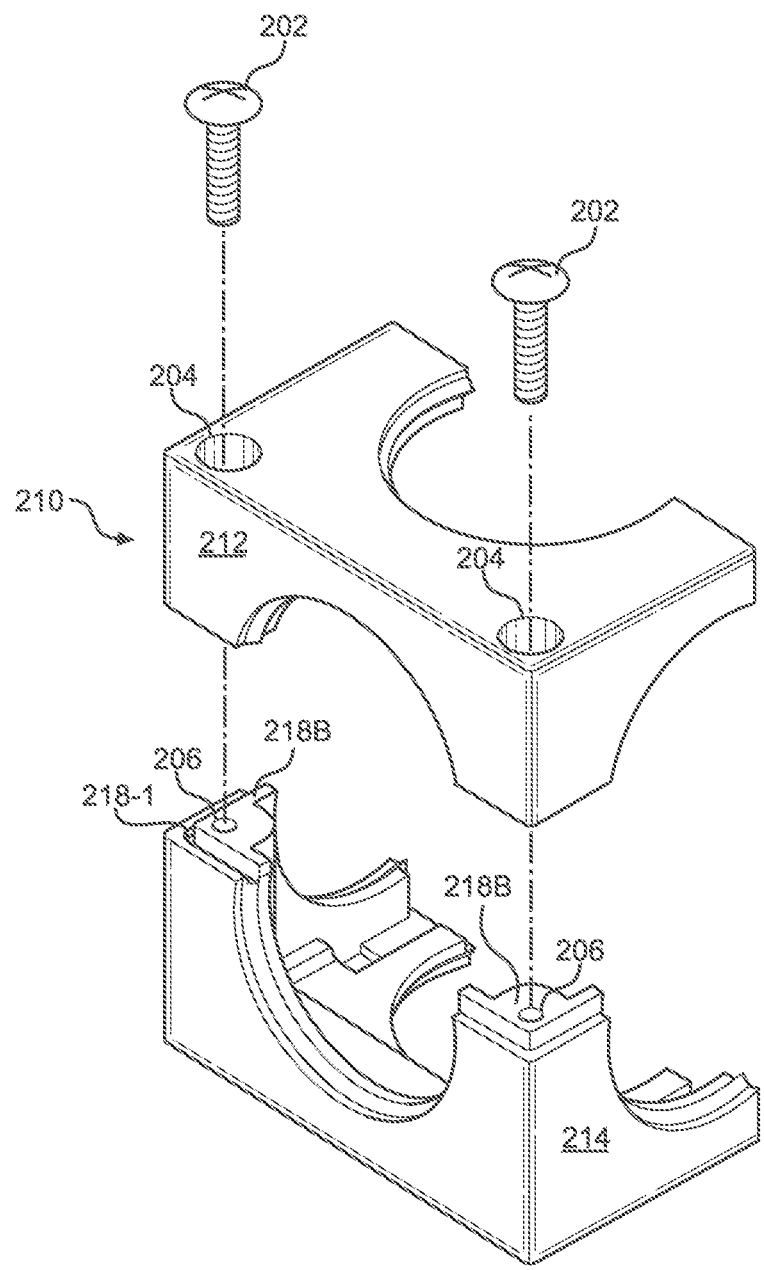
Figure 2C:
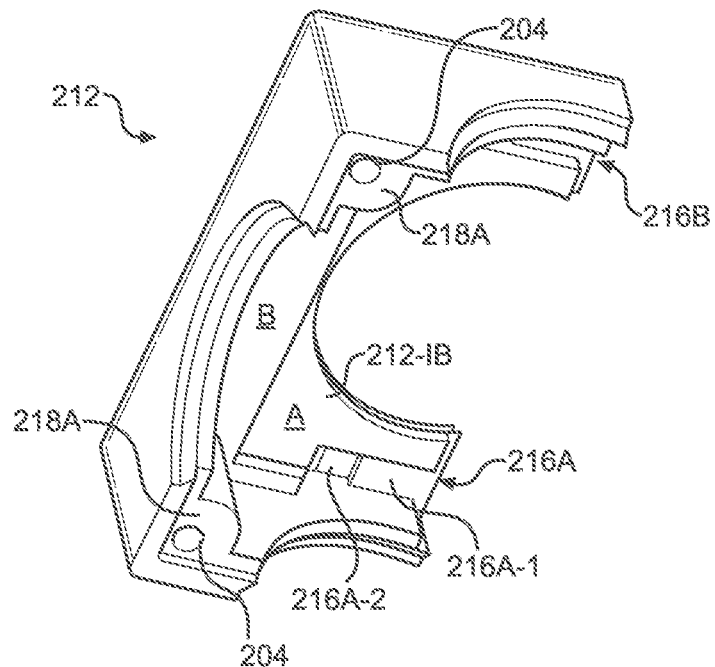
Figure 2D:
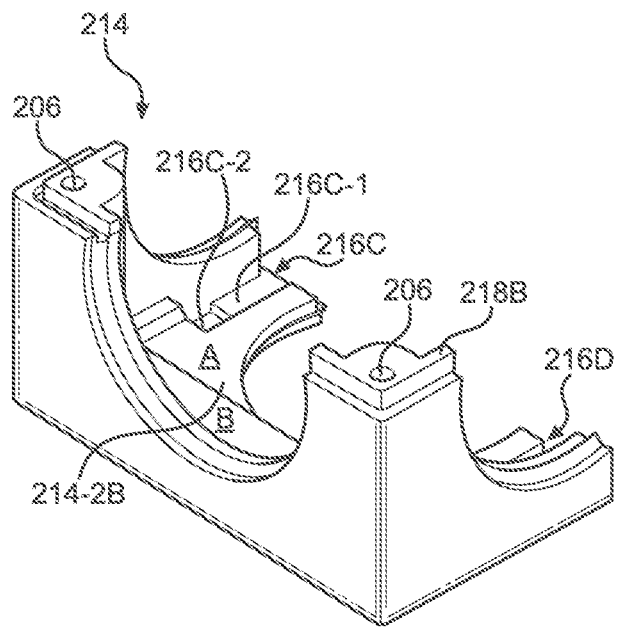

Referring now to FIG. 2A, FIG. 2B, FIG. 2C, and FIG. 2D, perspective, perspective assembly, upper perspective, and lower perspective views of a female component 210 of a modular junction box according to some embodiments are shown. In some embodiments, female component 210 may comprise one or more fasteners 202 (depicted in FIG. 2B) engaged with first or upper fastening features 204 and/or second or lower fastening features 206 to selectively and/or removably couple a first or upper female portion 212 (e.g., comprising and/or defining at least an inner top surface 212-1B) to a second or lower female portion 214 (e.g., comprising and/or defining at least an inner bottom surface 214-2B). According to some embodiments, and as depicted in FIG. 2C and FIG. 2D, either or both of the female portions 212, 214 may comprise and/or define one or more mating features or slots 216A-D disposed and/or formed on the respective inner surfaces (top and bottom) 212-1B, 214-2B.

In some embodiments, the inner surfaces 212-1B, 214-2B may comprise and/or be formed at two elevations, planes, or levels: (i) a first or lower level "A" (e.g., disposed in a first plane) and (ii) a second or higher level "B" (e.g., disposed in a second plane that is parallel to, but offset from, the first plane). According to some embodiments, the lower level "A" may comprise a portion of the inner surfaces 212-1B, 214-2B and/or of the higher level "B" thereof that is cut, stamped, and/or otherwise formed such that it is depressed with respect to the higher level "B". The higher level "B" may also or alternatively comprise a portion of the inner surfaces 212-1B, 214-2B and/or of the lower level "A" thereof that is extruded, raised, and/or otherwise formed such that it protrudes with respect to the lower level "A". In such a manner, for example, the lower level "A" may form a seat (e.g., a first portion of a square or rectangular seat) and/or the higher level "B" may form a shoulder, e.g., surrounding and/or bordering the lower level "A" seat.

According to some embodiments, the mating slots 216A-D may be formed and/or disposed in and/or on one or more of the lower level "A" and the higher level "B" of the inner surfaces 212-1B, 214-2B. In some embodiments, and as depicted with respect to a first mating slot 216A in FIG. 2C and third mating slot 216C in FIG. 2D, the mating slots 216A-D may comprise a primary channel or recess 216A-1, 216C-1 and/or a secondary channel or recess 216A-2, 216C-2. The primary recess 216*a*-1, 216*c*-1 may comprise, for example, a cut, groove, channel, indentation, and/or other feature formed and/or otherwise disposed on the respective inner surfaces 212-1*b*, 214-2*b*. In some embodiments, the primary recesses 216A-1, 216C-1 may comprise slots that extends from a first, proximal, or entry end at a terminus of the respective female portions 212, 214 to a second, distal, or stop end at a certain distance from the first end—e.g., defining a length of the primary recesses 216A-1, 216C-1. According to some embodiments, the primary recesses 216A-1, 216C-1 may comprise and/or define a first depth that may, for example, range between one millimeter (1 mm) to a thickness of the respective female portions 212, 214 minus one millimeter (1 mm). In some embodiments, the primary recesses 216A-1, 216C-1 may comprise and/or define portions of varying depth of any practicable magnitude (e.g., zero (0) to the complete thickness of the respective female portions 212, 214).

In some embodiments, the secondary recesses 216A-2, 216C-2 may comprise and/or define a portion of the primary recesses 216A-1, 216C-1 that varies in one or more dimensions from the primary recesses 216A-1, 216C-1. The secondary recesses 216A-2, 216C-2 may comprise, for example, a portion of the length of the primary recesses 216A-1, 216C-1 that comprises and/or defines a second depth that is greater than or less than the first depth. According to some embodiments (such as depicted in FIG. 2C and FIG. 2D), the second depth may be greater than the first depth such that the secondary recesses 216A-2, 216C-2 form depressions within the primary recesses 216A-1, 216C-1 (e.g., extending the overall depth of the primary recesses 216A-1, 216C-1 at the locations of the secondary recesses 216A-2, 216C-2. In some embodiments, the secondary recesses 216A-2, 216C-2 may be formed with a size, shape, and/or other geometry configured for cooperative mating with one or more other elements (not shown).

According to some embodiments, the mating slots 216A-D (and/or primary recesses 216A-1, 216C-1) may be formed, cut, and/or disposed in the lower level "A" of the inner surfaces 212-1B, 214-2B such that the floors or extents of the primary recesses 216A-1, 216C-1 are disposed in a third plane that is parallel to, but offset from, the first plane. As depicted, the third plane may be offset from the first plane in a direction (e.g., a second direction) opposite to the offset (e.g., in a first direction) of the second plane from the first plane. In some embodiments, the secondary recesses 216A-2, 216C-2 may comprise "deeper" portions of the mating slots 216A-D that may be formed, cut, and/or disposed in the primary recesses 216A-1, 216C-1 such that the floors or extents of the secondary recesses 216A-2, 216C-2 are disposed in a fourth plane that is parallel to, but offset from the third plane, in the second direction.

In some embodiments, the upper female portion 212 may comprise and/or define one or more first or recessed mating surfaces 218A that are sized and/or shaped to couple, seat, and/or mate with corresponding second or projected mating surfaces 218B of the lower female portion 214. In some embodiments, and as depicted in FIG. 2B, FIG. 2C, and FIG. 2D, the recessed mating surfaces 218A and the projected mating surfaces 218B may comprise, define, and/or be oriented with the upper and lower fastening features 204, 206. In the non-limiting example case (depicted in FIG. 2B) of the upper and lower fastening features 204, 206 comprising holes and the fasteners 202 comprising screws, for example, the screw hole upper fastening feature 204 may be disposed through the upper female portion 212 and extend through to the recessed mating surfaces 218A thereof. Similarly, the screw hole lower fastening feature 206 may be disposed through the projected mating surfaces 218B of the lower female portion 214 and extend into the lower female portion 214. In such a manner, for example, the screw fasteners 202 may extend through the upper female portion 212 and into the lower female portion 214 through the axially aligned screw hole upper fastening features 204 and screw hole lower fastening features 206, with the joint between the upper female portion 212 and the lower female portion 214 being strengthened by the seating and/or mating of the respective recessed mating surfaces 218A and projected mating surfaces 218B. According to some embodiments, a gasket seat 218-1 may be provided (e.g., as shown in FIG. 2B) that permits installation of a gasket, ring, and/or seal (not shown) that provides a watertight and/or dustproof sealing of the female component 210 and/or the respective modular junction box of which it may comprise a portion.

In some embodiments, the female component 210 may comprise and/or define a plurality of ports 230, e.g., cut, formed, and/or otherwise disposed in or through one or more of the various surfaces and/or sides thereof. According to some embodiments, the female component 210 may comprise and/or define (fully or partially) a top port 230-1, a front port 230-3, and/or a right port 230-6. While the ports 230 are depicted as having the same or similar diameters, the size, shape, and/or quantity of the ports 230 may be increased or decreased and/or may vary amongst or between the various surfaces and/or sides. According to some embodiments, each port 230 may be formed by two (2) or more objects, portions, and/or components. As depicted in FIG. 2A, for example, (i) the top port 230-1 may be partially formed by the upper female portion 212 and partially formed (if at all) by a separate object that is not shown (e.g., a corresponding male and/or other upper portion), (ii) the right port 230-6 may be partially formed by each of the female portions 212, 214 and partially formed (if at all) by a separate object that is not shown (e.g., a corresponding male and/or other upper and/or lower portions), and/or (iii) the front port 230-3 may be completely formed between the upper and lower female portions 212, 214. In some embodiments, the formation and/or distribution of various portions of the ports 230 may be configured to enhance the coupling of adapters (not shown).

According to some embodiments for example, any given port 230 may be formed in at least a first portion "C" and a second portion "D". As depicted for purposes of non-limiting example in FIG. 2A, (i) the top port 230-1 may be defined (at least partially) by a first portion "C" formed by the upper female portion 212, (ii) the front port 230-3 may be defined by a first portion "C" formed by the lower female portion 214 and a second portion "D" formed by the upper female portion 212, and/or (iii) the right port 230-6 may be defined (at least partially) by a first portion "C" formed by the lower female portion 214 and the upper female portion 212 (where the first portion "C" may comprise a third portion "E" formed by the lower female portion 214 and a fourth portion "F" formed by the upper female portion 212). In some embodiments, the ratio of the first and second portions "C" and "D" may be established such that the first portions "C" comprise a larger percentage of the overall ports 230 than the second portions "D". As depicted, and in the case of circular ports 230 for example, the first portions "C" may comprise between fifty-one percent (51%) and seventy-five percent (75%) or between fifty-five percent (55%) and sixty percent (60%) of the ports 230 and the second portions "D" may comprise between forty-nine percent (49%) and twenty-five (25%) or between forty percent (40%) and forty-five percent (45%) of the ports 230 (in terms of diameter, area, circumference, and/or other dimensions). According to some embodiments, the first portions "C" may comprise fifty-eight percent (58%) to fifty-nine percent (59%) of the ports 230 and the second portions "D" may comprise between forty-one percent (41%) and forty-two percent (42%) of the ports 230. In such a manner, for example, adapters (not shown) of various geometries and/or sizes may be inserted into and/or engaged with at least the first portions "C" of the ports 230 and thereby be selectively and/or removably retained therein. A circular adapter having a diameter equal to the top port 230-1, for example, may "snap" into the first portion "C" of the top port 230-1 as the diameter pushes past the smaller cord opening of the first portion "C". This "snap" action may, in some embodiments, represent the overcoming of an interference force that, once engaged, prevents the adapter from being removed from the first portion "C" absent an equivalent (or similar) removal force being applied. According to some embodiments, such a selectively self-restraining coupling may promote easier assembly of the female component 210 and/or of an overall modular junction box (not shown) of which the female component 210 is a part or portion of.

In some embodiments, any or all of the components 202, 204, 206, 212, 212-1B, 214, 214-2B, 216A-D, 216A-1, 216C-1, 216A-2, 216C-2, 218A, 218B, 230, 230-1, 230-3, 230-6 of the female component 210 may be similar in configuration and/or functionality to any similarly named and/or numbered components described herein. Fewer or more components 202, 204, 206, 212, 212-1B, 214, 214-2B, 216A-D, 216A-1, 216C-1, 216A-2, 216C-2, 218A, 218B, 230, 230-1, 230-3, 230-6 (and/or portions thereof) and/or various configurations of the components 202, 204, 206, 212, 212-1B, 214, 214-2B, 216A-D, 216A-1, 216C-1, 216A-2, 216C-2, 218A, 218B, 230, 230-1, 230-3, 230-6 may be included in the female component 210 without deviating from the scope of embodiments described herein. In some embodiments, one or more of the various components 202, 204, 206, 212, 212-1B, 214, 214-2B, 216A-D, 216A-1, 216C-1, 216A-2, 216C-2, 218A, 218B, 230, 230-1, 230-3, 230-6 may not be needed and/or desired in the female component 210.

Figure 3A:
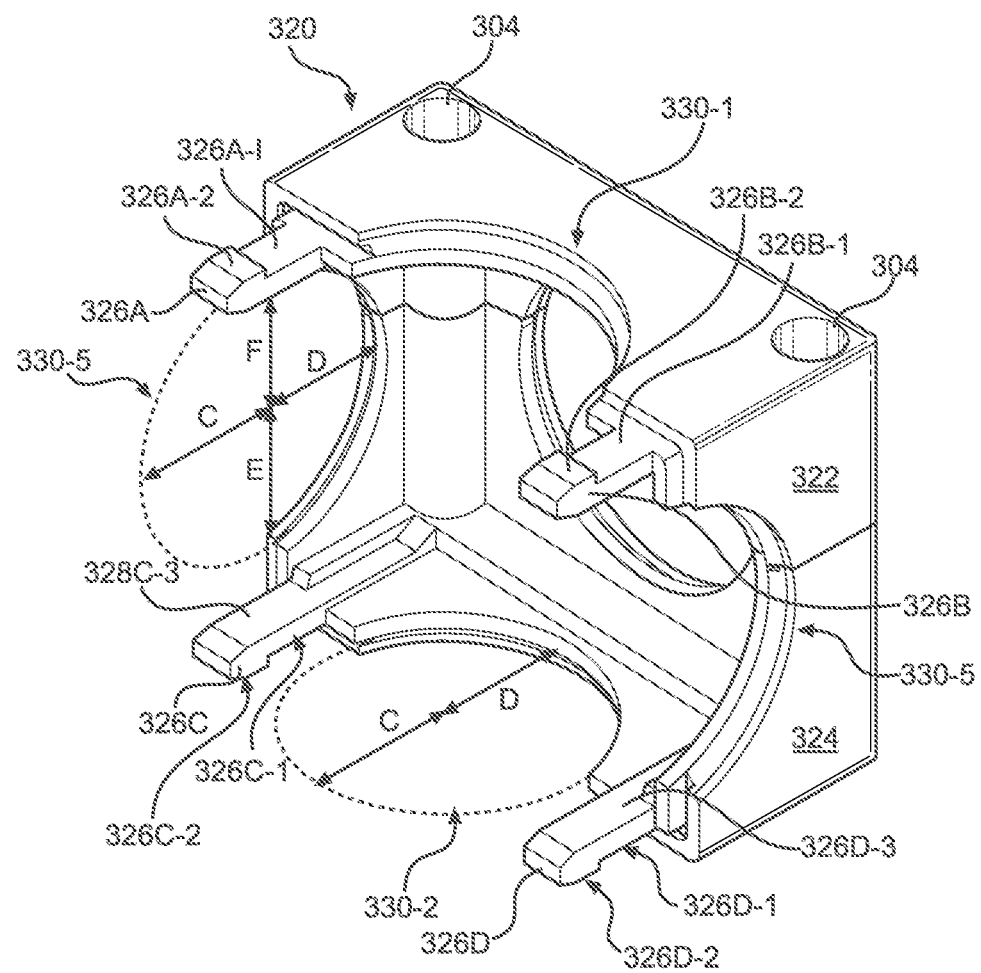
FIG. 3A, FIG. 3B, FIG. 3C, and FIG. 3D are perspective, perspective assembly, upper perspective, and lower perspective views of a male portion of a modular junction box according to some embodiments.
Figure 3B:
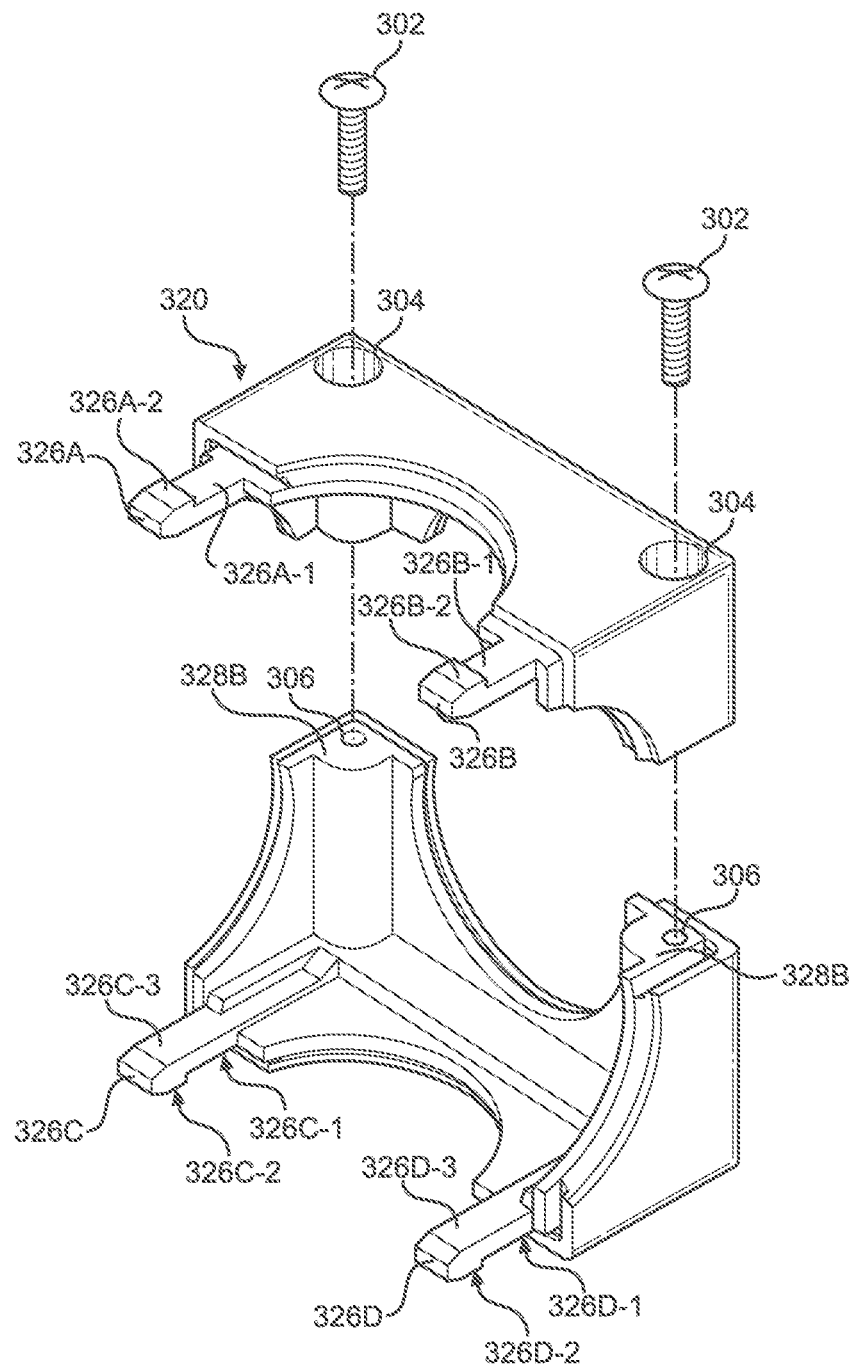
Figure 3C:
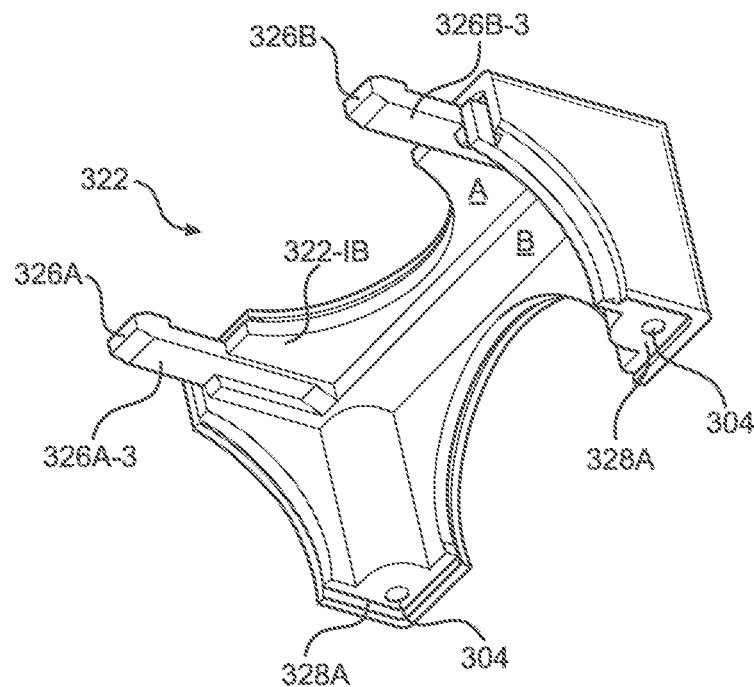
Figure 3D:
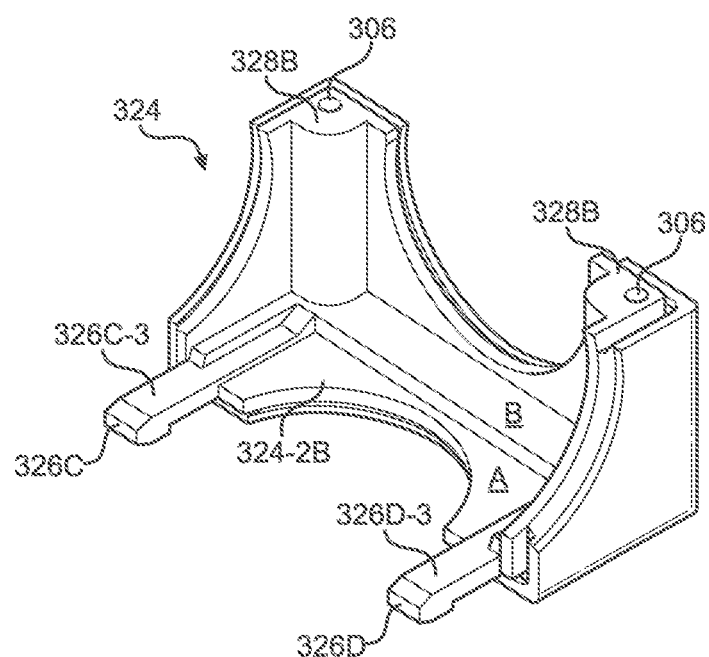

Turning to FIG. 3A, FIG. 3B, FIG. 3C, and FIG. 3D, perspective, perspective assembly, upper perspective, and lower perspective views of a male component 320 of a modular junction box according to some embodiments are shown. In some embodiments, the male component 320 may comprise one or more fasteners 302 (depicted in FIG. 3B) engaged with first or upper fastening features 304 and/or second or lower fastening features 306 to selectively and/or removably couple a first or upper male portion 322 (e.g., comprising and/or defining at least an inner top surface 322-1B) to a second or lower male portion 324 (e.g., comprising and/or defining at least an inner bottom surface 324-2B). According to some embodiments, and as depicted in FIG. 3C and FIG. 3D, either or both of the male portions 322, 324 may comprise and/or define one or more mating features or latch arms 326A-D disposed and/or formed on the respective inner surfaces (top and bottom) 322-1B, 324-2B.

In some embodiments, the inner surfaces 322-1B, 324-2B may comprise and/or be formed at two elevations, planes, or levels: (i) a first or lower level "A" (e.g., disposed in a first plane) and (ii) a second or higher level "B" (e.g., disposed in a second plane that is parallel to, but offset from, the first plane). According to some embodiments, the lower level "A" may comprise a portion of the inner surfaces 322-1B, 324-2B and/or of the higher level "B" thereof that is cut, stamped, and/or otherwise formed such that it is depressed with respect to the higher level "B". The higher level "B" may also or alternatively comprise a portion of the inner surfaces 322-1B, 324-2B and/or of the lower level "A" thereof that is extruded, raised, and/or otherwise formed such that it protrudes with respect to the lower level "A". In such a manner, for example, the lower level "A" may form a seat (e.g., a first portion of a square or rectangular seat) and/or the higher level "B" may form a shoulder, e.g., surrounding and/or bordering the lower level "A" seat.

According to some embodiments, the latch arms 326A-D may be formed and/or disposed in and/or on one or more of the lower level "A" and the higher level "B" of the inner surfaces 322-1B, 324-2B. In some embodiments, the latch arms 326A-D may comprise elongated projections defining respective primary latching surfaces 326A-1, 326B-1, 326C-1, 326D-1, secondary latching surfaces 326A-2, 326B-2, 326C-2, 326D-2, and/or respective latch arm back surfaces 326A-3, 326B-3, 326C-3, 326D-3. In some embodiments, the latch arms 326A-D may extend from the respective upper male portion 322 and the lower male portion 324 along or in parallel with respective planes of the inner surfaces 322-1B, 324-2B. First and second latch arms 326A-B (and/or the respective latch arm back surfaces 326A-3, 326B-3 thereof) may extend from and/or be coplanar with the inner top surface 322-1B (and/or the first level "A" or lower level "B" thereof) of the upper male portion 322, for example, and/or third and fourth latch arms 326C-D (and/or the respective latch arm back surfaces 326C-3, 326D-3 thereof) may extend from and/or be coplanar with the inner bottom surface 324-2B (and/or the first level "A" or lower level "B" thereof) of the lower male portion 324. In some embodiments, the latch arms 326A-D may be sized and/or shaped to seat, mate, and/or couple with respective mating slots (not shown; e.g., the mating slots 216A-D of FIG. 2A, FIG. 2B, FIG. 2C, and/or FIG. 2D herein) of a separate but cooperative female component (also not shown; e.g., the female component 210 of FIG. 2A, FIG. 2B, FIG. 2C, and/or FIG. 2D herein). The length and/or width of the latch arms 326A-D may be sized and/or shaped, for example, to fit within the corresponding primary slots, recesses, and/or other cooperative mating features.

According to some embodiments, the primary latching surfaces 326A-1, 326B-1, 326C-1, 326D-1 may be configured to seat, mate, and/or couple with the corresponding mating slots, for example, and/or the secondary latching surfaces 326A-2, 326B-2, 326C-2, 326D-2 may be configured to seat, mate, and/or couple with corresponding secondary recesses, latch stops, catches, etc. (not shown). In the case that the secondary latching surfaces 326A-2, 326B-2, 326C-2, 326D-2 comprise projections (e.g., outward projections as depicted) and the secondary recesses or catches comprise and/or define latching receptacles or features, engagement of the secondary latching surfaces 326A-2, 326B-2, 326C-2, 326D-2 with the secondary recesses/catches may prevent axial or planar disengagement of the male portion 320 and any respectively mated or coupled female portion. According to some embodiments, the latch arms 326A-D may be configured to be elastically pliable such that they may be selectively bent inwardly from their respective planes to disengage the secondary latching surfaces 326A-2, 326B-2, 326C-2, 326D-2 with the secondary recesses/catches, thereby selectively decoupling the male portion 320 and any respectively mated or coupled female portion. According to some embodiments, the latch arms 326A-D may be rigid, such that decoupling requires a change in angle and/or orientation of the latch arms 326A-D to unseat the secondary latching surfaces 326A-2, 326B-2, 326C-2, 326D-2 from the cooperative secondary recesses/catches.

In some embodiments, the latch arms 326A-D may comprise and/or define a first thickness between the primary latching surfaces 326A-1, 326B-1, 326C-1, 326D-1 and the latch arm back surfaces 326A-3, 326B-3, 326C-3, 326D-3 and/or may comprise and/or define a second thickness between the secondary latching surfaces 326A-2, 326B-2, 326C-2, 326D-2 and the latch arm back surfaces 326A-3, 326B-3, 326C-3, 326D-3. According to some embodiments, the first and second thicknesses may be configured such that in the case that the latch arms 326A-D are seated in and/or coupled to the corresponding mating slots, the latch arm back surfaces 326A-3, 326B-3, 326C-3, 326D-3 are disposed coplanar and/or flush with the respective inner top surfaces 322-1B and inner bottom surfaces 324-2B (e.g., with either or both of the first level "A" or lower level "B" thereof). The first thickness of the latch arms 326A-D may be equivalent to a first depth of the primary recess, for example, and/or the second thickness of the latch arms 326A-D may be equivalent to a second depth of the secondary recesses/catches. In some embodiments, the latch arms 326A-D may be otherwise formed with a size, shape, and/or other geometry to match and/or be cooperative with the geometry of the mating slots.

According to some embodiments, the upper male portion 322 may comprise and/or define one or more first or recessed mating surfaces 328A that are sized and/or shaped to couple, seat, and/or mate with corresponding second or projected mating surfaces 328B of the lower male portion 324. In some embodiments, and as depicted in FIG. 3B, FIG. 3C, and FIG. 3D, the recessed mating surfaces 328A and the projected mating surfaces 328B may comprise, define, and/or be oriented with the upper and lower fastening features 304, 306. In the non-limiting example case (depicted in FIG. 3B) of the upper and lower fastening features 304, 306 comprising holes and the fasteners 302 comprising screws, for example, the screw hole upper fastening feature 304 may be disposed through the upper male portion 322 and extend through to the recessed mating surfaces 328A thereof. Similarly, the screw hole lower fastening feature 306 may be disposed through the projected mating surfaces 328B of the lower male portion 324 and extend into the lower male portion 324. In such a manner, for example, the screw fasteners 302 may extend through the upper male portion 322 and into the lower male portion 324 through the axially aligned screw hole upper fastening features 304 and screw hole lower fastening features 306, with the joint between the upper male portion 322 and the lower male portion 324 being strengthened by the seating and/or mating of the respective recessed mating surfaces 328A and projected mating surfaces 328B.

In some embodiments, the male component 320 may comprise and/or define a plurality of ports 330, e.g., cut, formed, and/or otherwise disposed in or through one or more of the various surfaces and/or sides thereof. According to some embodiments, the male component 320 may comprise and/or define (fully or partially) a top port 330-1, a bottom port 330-2, a left port 330-5, and/or a right port 330-6. While the ports 330 are depicted as having the same or similar diameters, the size, shape, and/or quantity of the ports 330 may be increased or decreased and/or may vary amongst or between the various surfaces and/or sides. According to some embodiments, each port 330 may be formed by two (2) or more objects, portions, and/or components. As depicted in FIG. 3A, for example, (i) the top port 330-1 may be partially formed by the upper male portion 322 and partially formed (if at all) by a separate object that is not shown (e.g., a corresponding female and/or other upper portion), (ii) the bottom port 330-2 may be partially formed by the lower male portion 324 and partially formed (if at all) by a separate object that is not shown (e.g., a corresponding female and/or other lower portion), (iii) the left port 330-5 may be partially formed by each of the male portions 322, 324 and partially formed (if at all) by a separate object that is not shown (e.g., a corresponding female and/or other upper and/or lower portions), and/or (iv) the right port 330-6 may be partially formed by each of the male portions 322, 324 and partially formed (if at all) by a separate object that is not shown (e.g., a corresponding female and/or other upper and/or lower portions). In some embodiments, the formation and/or distribution of various portions of the ports 330 may be configured to enhance the coupling of adapters (not shown).

According to some embodiments for example, any given port 330 may be formed in at least a first portion "C" and a second portion "D". As depicted for purposes of non-limiting example in FIG. 3A, (i) the bottom port 330-2 may be defined (at least partially) by a second portion "D" formed by the upper male portion 322 and/or (ii) the left port 330-5 may be defined by a second portion "D" formed by the lower male portion 324 and the upper male portion 322 (where the second portion "D" may comprise a third portion "E" formed by the lower male portion 324 and a fourth portion "F" formed by the upper male portion 322). In some embodiments, the ratio of the first and second portions "C" and "D" may be established such that the first portions "C" (e.g., defined and/or formed by one or more other objects, portions, and/or components; not shown) comprise a larger percentage of the overall ports 330 than the second portions "D", as described herein.

In some embodiments, any or all of the components 302, 304, 306, 322, 322-1B, 324, 324-2B, 326A-D, 326A-1, 326B-1, 326C-1, 326D-1, 326A-2, 326B-2, 326C-2, 326D-2, 326A-3, 326B-3, 326C-3, 326D-3, 328A, 328B, 330-1, 330-2, 330-5, 330-6 of the male component 320 may be similar in configuration and/or functionality to any similarly named and/or numbered components described herein. Fewer or more components 302, 304, 306, 322, 322-1B, 324, 324-2B, 326A-D, 326A-1, 326B-1, 326C-1, 326D-1, 326A-2, 326B-2, 326C-2, 326D-2, 326A-3, 326B-3, 326C-3, 326D-3, 328A, 328B, 330-1, 330-2, 330-5, 330-6 (and/or portions thereof) and/or various configurations of the components 302, 304, 306, 322, 322-1B, 324, 324-2B, 326A-D, 326A-1, 326B-1, 326C-1, 326D-1, 326A-2, 326B-2, 326C-2, 326D-2, 326A-3, 326B-3, 326C-3, 326D-3, 328A, 328B, 330-1, 330-2, 330-5, 330-6 may be included in the male component 320 without deviating from the scope of embodiments described herein. In some embodiments, one or more of the various components 302, 304, 306, 322, 322-1B, 324, 324-2B, 326A-D, 326A-1, 326B-1, 326C-1, 326D-1, 326A-2, 326B-2, 326C-2, 326D-2, 326A-3, 326B-3, 326C-3, 326D-3, 328A, 328B, 330-1, 330-2, 330-5, 330-6 may not be needed and/or desired in the male component 320.

IV. Modular Junction Box System

Figure 4A:
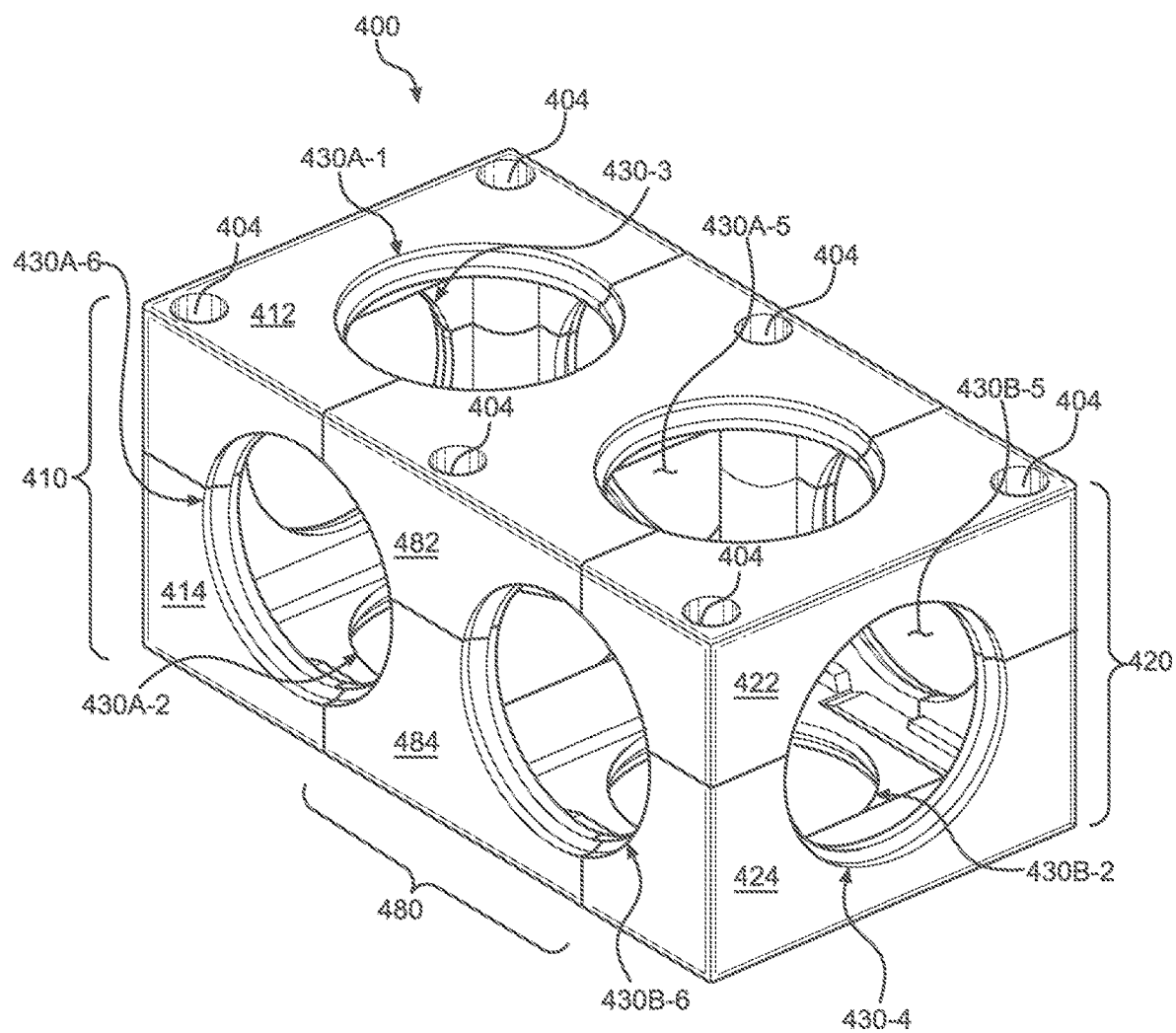
FIG. 4A, FIG. 4B, and FIG. 4C are perspective, perspective cross-section, and perspective assembly views of a modular junction box according to some embodiments.
Figure 4B:
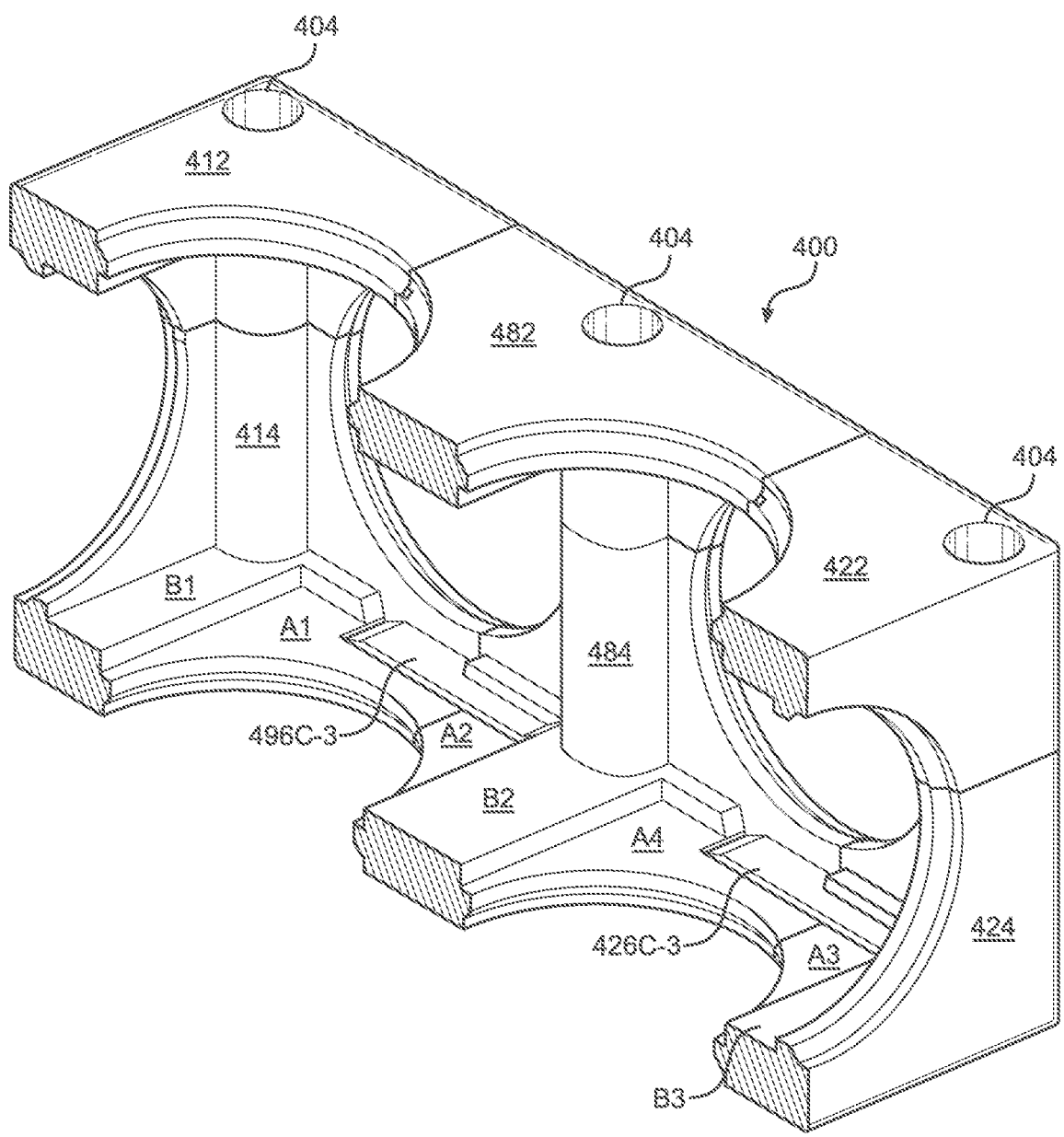
Figure 4C:
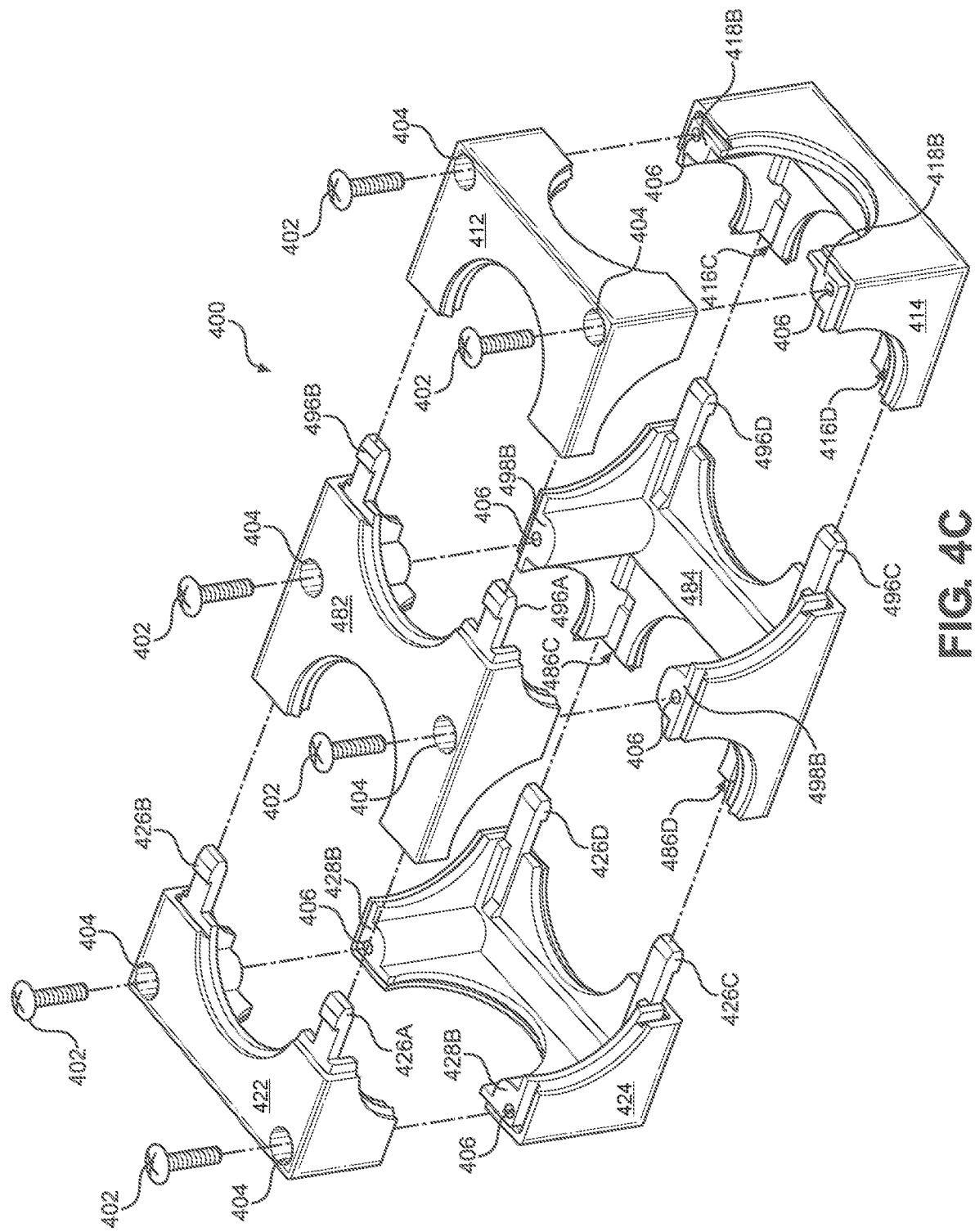

Turning to FIG. 4A, FIG. 4B, and FIG. 4C, perspective, perspective cross-section, and perspective assembly views of a modular junction box 400 according to some embodiments are shown. In some embodiments, the modular junction box 400 may provide an example of how the modular junction box 400 may comprise and/or provide an expandable connection platform. The modular junction box 400 may comprise, for example, a plurality of fasteners 402 (depicted in FIG. 4C) engaged with one or more upper fastening features 404 and/or one or more lower and/or corresponding fastening features 406 to form, couple, and/or secure a first or female portion or component 410 and/or portions or elements thereof. The fasteners 402 may, for example, selectively and/or removably couple a first or upper female portion 412 to a second or lower female portion 414 (e.g., comprising and/or defining mating features or slots 416C-D).

As depicted in FIG. 4C for example, at least the lower female portion 414 may comprise and/or define mating slots 416C-D formed, respectively, thereon (or therein). In some embodiments, the mating slots 416C-D may be formed with a size, shape, and/or other geometry configured for cooperative mating with one or more other elements (described herein, and hereinafter).

According to some embodiments, the lower female portion 414 may comprise and/or define one or more mating surfaces 418B that are sized and/or shaped to couple, seat, and/or mate with corresponding surfaces (not shown) of the upper female portion 412. In some embodiments, and as depicted in 4C, the mating surfaces 418B may comprise, define, and/or be oriented with the upper and lower fastening features 404, 406. In the non-limiting example case (depicted in FIG. 4C) of the upper and lower fastening features 404, 406 comprising holes and the fasteners 402 comprising screws, for example, the screw hole upper fastening feature 404 may be disposed through the upper female portion 412. Similarly, the screw hole lower fastening feature 406 may be disposed through the mating surfaces 418B of the lower female portion 414 and extend into the lower female portion 414. In such a manner, for example, the screw fasteners 402 may extend through the upper female portion 412 and into the lower female portion 414 through the axially aligned screw hole upper fastening features 404 and screw hole lower fastening features 406, with the joint between the upper female portion 412 and the lower female portion 414 being strengthened by the seating and/or mating of the mating surfaces 418B with corresponding features of the upper female portion 412.

In some embodiments, the fasteners 402 may be engaged with the one or more upper fastening features 404 and/or the one or more lower and/or corresponding fastening features 406 to form, couple, and/or secure a second or male portion or component 420 and/or portions or elements thereof. The fasteners 402 may, for example, selectively and/or removably couple a first or upper male portion 422 (e.g., comprising and/or defining first and second latch arms 426A-B) to a second or lower male portion 424 (e.g., comprising and/or defining a third latch arm 426C (comprising and/or defining a third latch arm back surface 426C-3) and a fourth latch arm 426D).

As depicted in FIG. 4C for example, each of the upper male portion 422 and the lower male portion 424 may comprise and/or define mating or latch arms 426A-D formed and/or coupled, respectively, thereto (or thereon). In some embodiments, the latch arms 426A-D may comprise (and as depicted and numbered in FIG. 4C) elongated projections that may be sized and/or shaped to seat, mate, and/or couple with respective mating slots 416C-D of the female component 410 (e.g., in the case that the male portion 420 is coupled directly to the female portion 410—not shown). The length and/or width of the latch arms 426A-D may be sized and/or shaped, for example, to fit within the corresponding mating slots 416C-D.

According to some embodiments, the lower male portion 424 may comprise and/or define one or more mating surfaces 428B that are sized and/or shaped to couple, seat, and/or mate with corresponding surfaces (not shown) of the upper male portion 422. In some embodiments, and as depicted in FIG. 4C, the mating surfaces 428B may comprise, define, and/or be oriented with the upper and lower fastening features 404, 406. In the non-limiting example case (depicted in FIG. 4C) of the upper and lower fastening features 404, 406 comprising holes and the fasteners 402 comprising screws, for example, the screw hole upper fastening feature 404 may be disposed through the upper male portion 422. Similarly, the screw hole lower fastening feature 406 may be disposed through the mating surfaces 428B of the lower male portion 424 and extend into the lower male portion 424. In such a manner, for example, the screw fasteners 402 may extend through the upper male portion 422 and into the lower male portion 424 through the axially aligned screw hole upper fastening features 404 and screw hole lower fastening features 406, with the joint between the upper male portion 422 and the lower male portion 424 being strengthened by the seating and/or mating of the mating surfaces 428B with corresponding features of the upper male portion 422.

In some embodiments, the modular junction box 400 may comprise and/or define a plurality of ports 430, e.g., cut, formed, and/or otherwise disposed in or through one or more of the various surfaces and/or sides of the components 410, 420. In the case that the modular junction box 400 comprises a six (6)-sided rectangular box shape (as depicted for non-limiting purposes of example), the modular junction box 400 may comprise and/or define a first top port 430A-1, a second top port 430B-1, a bottom port 130-2, a first bottom port 430A-2, a second bottom port 430B-2, a front port 430-3, a back port 430-4, a first left port 430A-5, a second left port 430B-5, a first right port 430A-6, and/or a second right port 430B-6. While the ports 430 are depicted as having the same or similar diameters, the size, shape, and/or quantity of the ports 430 may be increased or decreased and/or may vary amongst or between the various surfaces and/or sides.

According to some embodiments, some of the ports 430 may be formed by inclusion of an expansion component 480 that is assembled and/or coupled between the male and female components 410, 420. In some embodiments, the fasteners 402 may be engaged with the one or more upper fastening features 404 and/or the one or more lower and/or corresponding fastening features 406 to form, couple, and/or secure a third or expansion portion or component 480 and/or portions or elements thereof. The fasteners 402 may, for example, selectively and/or removably couple a first or upper expansion portion 482 (e.g., comprising and/or defining first and second latch arms 496A-B) to a second or lower expansion portion 484 (e.g., comprising and/or defining third and fourth mating slots 486C-D and/or a third latch arm 496C (comprising and/or defining a third latch arm back surface 496C-3) and a fourth latch arm 496D).

According to some embodiments, the lower expansion portion 484 may comprise and/or define one or more mating surfaces 498B that are sized and/or shaped to couple, seat, and/or mate with corresponding surfaces (not shown) of the upper expansion portion 482. In some embodiments, and as depicted in FIG. 4C, the mating surfaces 498B may comprise, define, and/or be oriented with the upper and lower fastening features 404, 406. In the non-limiting example case (depicted in FIG. 4C) of the upper and lower fastening features 404, 406 comprising holes and the fasteners 402 comprising screws, for example, the screw hole upper fastening feature 404 may be disposed through the upper expansion portion 482. Similarly, the screw hole lower fastening feature 406 may be disposed through the mating surfaces 498B of the lower expansion portion 484 and extend into the lower expansion portion 484. In such a manner, for example, the screw fasteners 402 may extend through the upper expansion portion 482 and into the lower expansion portion 484 through the axially aligned screw hole upper fastening features 404 and screw hole lower fastening features 406, with the joint between the upper expansion portion 482 and the lower expansion portion 484 being strengthened by the seating and/or mating of the mating surfaces 498B with corresponding features of the upper expansion portion 482.

In some embodiments, one or more expansion components 480 may be arranged and/or assembled between two or more female and male components 410, 420. As depicted in FIG. 4A and FIG. 4C, for example, a single expansion component 480 may be coupled between the female component 410 and the male component 420, thereby forming the various ports 430 and/or defining the modular junction box 400. According to some embodiments, and as depicted in FIG. 4B, the coupling of the lower portions 414, 424, 484 may form and/or define various areas such as a first lower area "A1", a second lower area "A2", a third lower area "A3", a first upper area "B1", a second upper area "B2", and/or a third upper area "B3". In some embodiments, each of the lower areas "A1-A4" may be disposed and/or oriented in a first or lower plane while each of the upper areas "B1-B3" may be disposed and/or orientated in a second or upper plane that is, e.g., parallel to and offset from the first plane. According to some embodiments, the first and second lower areas "A1", "A2" may form and/or define a first seat and/or the third and fourth lower areas "A3", "A4" may form and/or define a second seat. In some embodiments, the first and/or second seats may be sized and/or shaped (e.g., square as depicted for purposes of non-limiting example) to accept, house, and/or mate with an adapter (not shown) and/or a portion thereof (such as a mounting flange; also not shown).

According to some embodiments, at least a portion of the third latch arm back surfaces 426C-3, 496C-3 may be disposed, in the case that they are engaged with respective mating slots (as depicted in FIG. 4B; not separately labeled) of the respective lower expansion portion 484 and the lower female portion 414 for example, coplanar with the respective lower areas "A1-A4". In such a manner, for example, a properly sized and/or shaped mounting flange (e.g., the mounting flange 550 of FIG. 5A and/or FIG. 5B herein) that is disposed and/or coupled in a first seat may cover and/or engage with each of the first lower area "A1", the second lower area "A2", and the third latch arm back surface 496C-3 of the third latch arm 496C of the lower expansion portion 484. According to some embodiments, a properly sized and/or shaped mounting flange (e.g., the mounting flange 550 of FIG. 5A and/or FIG. 5B herein) that is disposed and/or coupled in a second seat may cover and/or engage with each of the third lower area "A3", the fourth lower area "A4", and the third latch arm back surface 426C-3 of the third latch arm 426C of the lower male portion 424. In such a manner, for example, the mounting flanges may prevent the latch arms 426A-D, 496A-D from disengaging from their coupled positions. In other words, an adapter (and/or mounting flange thereof) may need to be removed from the modular junction box 400, in some embodiments, to permit the female component 410 and/or male component 420 to be disengaged and/or disassembled from the expansion component 480.

In some embodiments, the modular junction box 400 may also or alternatively comprise the ability to be expanded and/or extended in other directions. While the depicted expansion components 480 permit the length (e.g., in the case of the rectilinear shaped modular junction box 400 shown for purposes of non-limiting example in FIG. 4A) of the modular junction box 400 to be expanded, for example, one or more additional components (not shown) may be include in the modular junction box 400 that permit the height of the modular junction box 400 to be expanded. Such components may, for example, be disposed between the upper portions 412, 422, 482 and their respective lower portions 414, 424, 484, for example. According to some embodiments, the width of the modular junction box 400 may be expanded by providing for upper portions 412, 422, 482 and their respective lower portions 414, 424, 484 that are each split into two or more sections (not shown) that are selectively mated together to form the width of the modular junction box 400 and between which one or more width expansion components (not shown) may be coupled to expand the width of the modular junction box 400.

According to some embodiments, any or all of the components 402, 404, 406, 410, 412, 414, 416C-D, 418B, 420, 422, 424, 426A-D, 426C-3, 428B, 430, 430A-1, 430B-1, 430A-2, 430B-2, 430-3, 430-4, 430A-5, 430B-5, 430A-6, 430B-6, 480, 482, 484, 486C-D, 498B, 496A-D, 496C-3 of the modular junction box 400 may be similar in configuration and/or functionality to any similarly named and/or numbered components described herein. Fewer or more components 402, 404, 406, 410, 412, 414, 416C-D, 418B, 420, 422, 424, 426A-D, 426C-3, 428B, 430, 430A-1, 430B-1, 430A-2, 430B-2, 430-3, 430-4, 430A-5, 430B-5, 430A-6, 430B-6, 480, 482, 484, 486C-D, 498B, 496A-D, 496C-3 (and/or portions thereof) and/or various configurations of the components 402, 404, 406, 410, 412, 414, 416C-D, 418B, 420, 422, 424, 426A-D, 426C-3, 428B, 430, 430A-1, 430B-1, 430A-2, 430B-2, 430-3, 430-4, 430A-5, 430B-5, 430A-6, 430B-6, 480, 482, 484, 486C-D, 498B, 496A-D, 496C-3 may be included in the modular junction box 400 without deviating from the scope of embodiments described herein. In some embodiments, one or more of the various components 402, 404, 406, 410, 412, 414, 416C-D, 418B, 420, 422, 424, 426A-D, 426C-3, 428B, 430, 430A-1, 430B-1, 430A-2, 430B-2, 430-3, 430-4, 430A-5, 430B-5, 430A-6, 430B-6, 480, 482, 484, 486C-D, 498B, 496A-D, 496C-3 may not be needed and/or desired in the modular junction box 400.

V. Modular Port Adapters

Figure 5A:
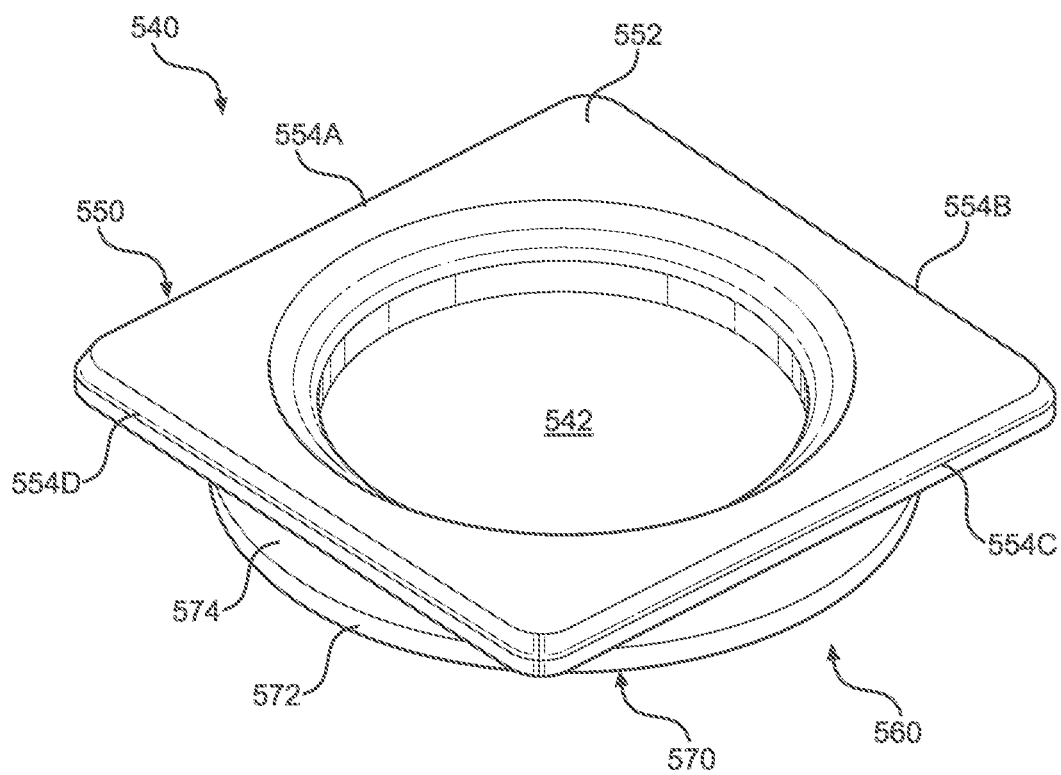
FIG. 5A and FIG. 5B are perspective and cross-section view of a modular port adapter according to some embodiments.
Figure 5B:
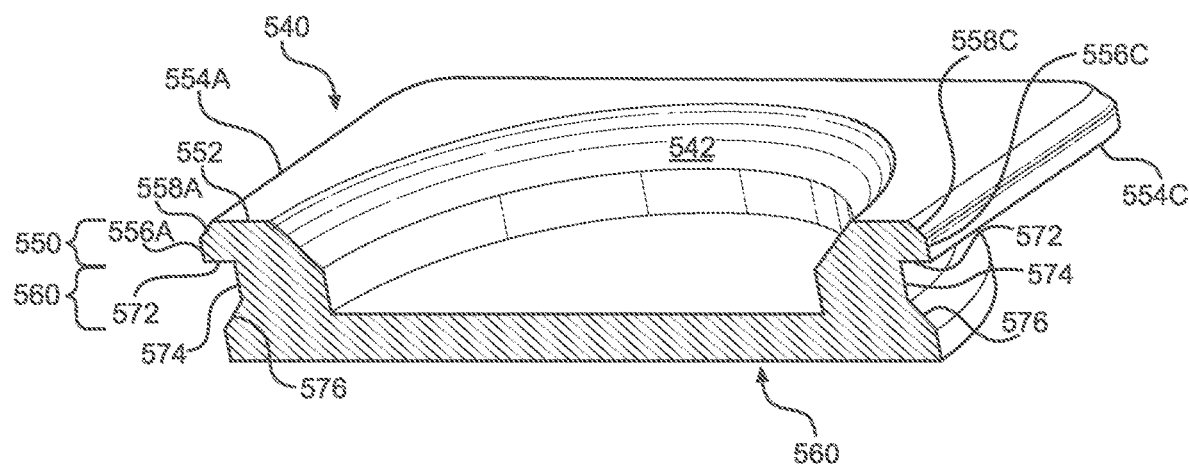

Referring now to FIG. 5A and FIG. 5B, perspective and cross-section view of a modular port adapter 540 according to some embodiments are shown. In some embodiments, the modular port adapter 540 may comprise a blank or plug as depicted, or may comprise one or more other types of adapters such as hose adapters, conduit adapters, wiring adapters, hose couplings, pipe couplings, compression fittings, threaded fittings, barbed fittings, etc. According to some embodiments, the modular port adapter 540 may be configured in various geometries and/or sizes (e.g., diameters and/or dimensions) to cooperatively accept and/or mate or couple with one or more desired types of objects. In some embodiments, the modular port adapter 540 may comprise and/or define an indentation, hole, port, passage, holder, depression, and/or recess 542 that is disposed on (or through, as the case may be) a mounting flange 550. The mounting flange 550 may comprise, for example, a portion of the modular port adapter 540 that is configured to be coupled to and/or retained by a corresponding seat (not shown; e.g., the seat formed by the first and second lower portions "A1-A2" (and/or the third latch arm back surface 496C-3) of FIG. 4B herein). In some embodiments, the mounting flange 550 may comprise and/or define a front surface 552 (e.g., in which the recess 542 is cut and/or formed) having a plurality of edges 554A-D. As depicted with respect to a first edge 554A and a third edge 554C in FIG. 5B, the edges 554A-D may comprise and/or terminate at a retaining edge 556A, 556C that may, for example, be oriented normal to the front surface 552 and/or may be joined to the front surface 552 by an edge bevel 558C, 558D.

According to some embodiments, the modular port adapter 540 may comprise and/or the mounting flange 550 may be coupled and/or joined to a connecting element 560. While the term connecting element 560 is utilized herein for convenience, as depicted in FIG. 5A and FIG. 5B with respect to the blank or plug version of the modular port adapter 540, the connecting element 560 may not necessarily be configured to connect to any external objects. In many cases however, the connecting element 560 may be appropriately sized and/or shaped to connect to and/or route or join any external objects that are or become known or practicable. In some embodiments, the connecting element 560 may be separated from the mounting flange 550 or connected to the mounting flange 550 by a mounting channel 570. The mounting channel 570 may, for example, comprise a circumferential groove, track, slot, and/or path that may be utilized to guide, mount, and/or couple the modular port adapter 540 to a modular junction box (and/or a port thereof; not shown; such as the left port 130-5 of FIG. 1F herein). In some embodiments, the mounting channel 570 may form a profile defined by one or more of an inner flange 572, a mating surface 574, and/or a mating bevel 576. The profile may, for example, be shaped and/or sized to match a corresponding profile (e.g., a male profile; not shown) of a perimeter or edge of a mounting port (not shown). According to some embodiments, the mounting flange 550 may be utilized to retain and/or restrain a latch arm (not shown). In the case that the mounting flange 550 is inserted into and/or coupled to a seat of a module junction box as described herein, for example, either or both of the inner flange 572 and one or more of the edges 554A-D may engage to limit or prevent movement of a corresponding latch arm (e.g., a latch arm back surface).

According to some embodiments, any or all of the components 542, 550, 552, 554A-D, 556A, 556C, 558A, 558C, 560, 570, 572, 574, 576 of the modular port adapter 540 may be similar in configuration and/or functionality to any similarly named and/or numbered components described herein. Fewer or more components 542, 550, 552, 554A-D, 556A, 556C, 558A, 558C, 560, 570, 572, 574, 576 (and/or portions thereof) and/or various configurations of the components

542, 550, 552, 554A-D, 556A, 556C, 558A, 558C, 560, 570, 572, 574, 576 may be included in the modular port adapter 540 without deviating from the scope of embodiments described herein. In some embodiments, one or more of the various components 542, 550, 552, 554A-D, 556A, 556C, 558A, 558C, 560, 570, 572, 574, 576 may not be needed and/or desired in the modular port adapter 540.

Figure 6A:
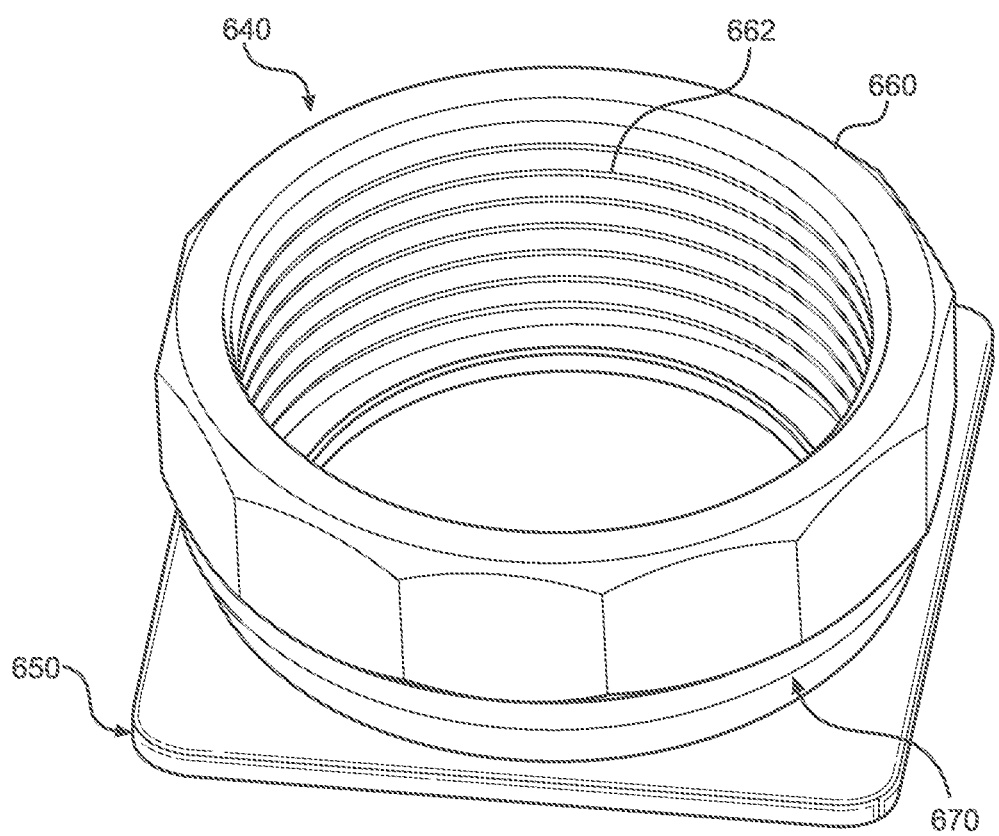
FIG. 6A and FIG. 6B are perspective and cross-section view of a modular port adapter according to some embodiments.
Figure 6B:
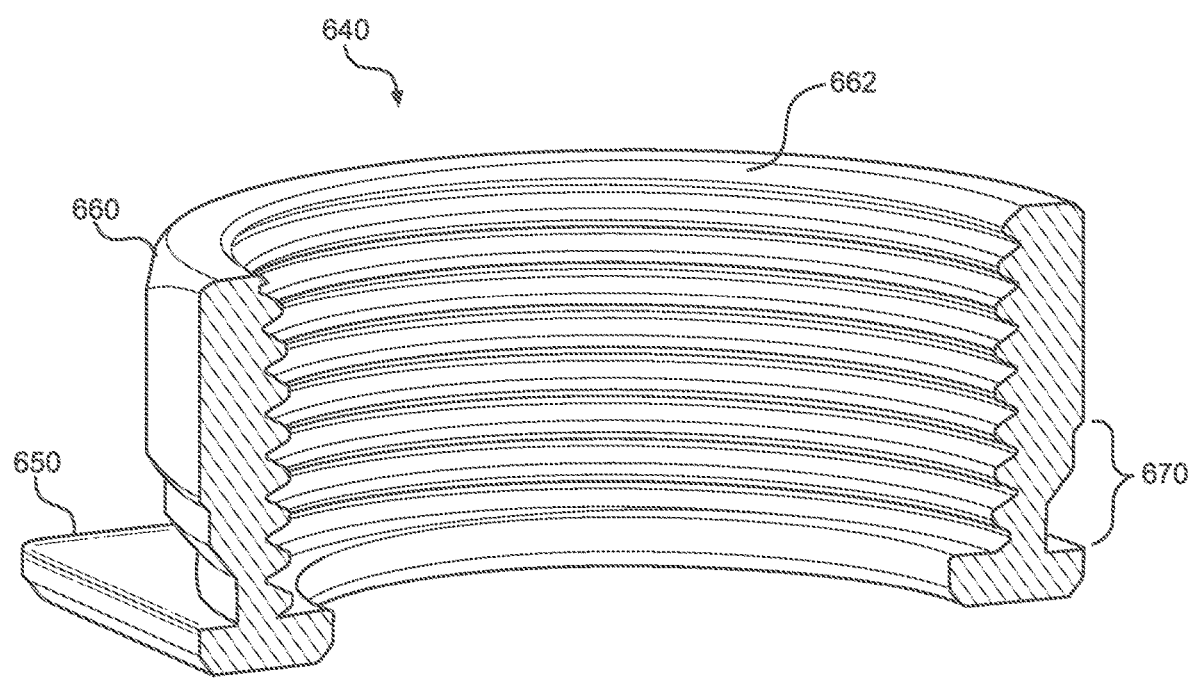

Referring now to FIG. 6A and FIG. 6B, perspective and cross-section view of a modular port adapter 640 according to some embodiments are shown. In some embodiments, the modular port adapter 640 may comprise threaded coupling as depicted, or may comprise one or more other types of adapters such as hose adapters, conduit adapters, wiring adapters, hose couplings, pipe couplings, compression fittings, threaded fittings, barbed fittings, etc. According to some embodiments, the modular port adapter 640 may be configured in various geometries and/or sizes (e.g., diameters and/or dimensions) to cooperatively accept and/or mate or couple with one or more desired types of objects. In some embodiments, the modular port adapter 640 may comprise and/or define a mounting flange 650 and/or a connecting element 660. The connecting element 660 may comprise, for example, internal threads 662 that may be selectively coupled, e.g., to a threaded hose, conduit, pipe, etc. (not shown).

According to some embodiments, the connecting element 660 may be separated from the mounting flange 650 or connected to the mounting flange 650 by a mounting channel 670. The mounting channel 670 may, for example, comprise a circumferential groove, track, slot, and/or path that may be utilized to guide, mount, and/or couple the modular port adapter 640 to a modular junction box (and/or a port thereof; not shown; such as the left port 130-5 of FIG. 1F herein). In some embodiments, the mounting channel 670 may form a profile that may be shaped and/or sized to match a corresponding profile (e.g., a male profile; not shown) of a perimeter or edge of a mounting port (not shown). According to some embodiments, the mounting flange 650 may be utilized to retain and/or restrain a latch arm (not shown), as described herein.

According to some embodiments, any or all of the components 650, 660, 662, 670 of the modular port adapter 640 may be similar in configuration and/or functionality to any similarly named and/or numbered components described herein. Fewer or more components 650, 660, 662, 670 (and/or portions thereof) and/or various configurations of the components 650, 660, 662, 670 may be included in the modular port adapter 640 without deviating from the scope of embodiments described herein. In some embodiments, one or more of the various components 650, 660, 662, 670 may not be needed and/or desired in the modular port adapter 640.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant currently intends to file additional applications to pursue patents for subject matter that has been disclosed and enabled but not claimed in the present application.

What is claimed is:

1. A modular junction box, comprising:
a female component defining at least one mating slot;
a male component defining at least one latch arm, the at least one latch arm at least partially receivable within the at least one mating slot to couple the female component and the male component; and
a modular adapter element disposed in a port formed by one or more of the female component and the male component, wherein at least one adapter surface of the modular adapter element is configured to engage a latch surface of the at least one latch arm to retain the at least one latch arm within the at least one mating slot to prevent decoupling of the female component and the male component.

2. The modular junction box of claim 1, wherein the female component comprises:
an upper female portion; and
a lower female portion coupled to the upper female portion.

3. The modular junction box of claim 2, further comprising:
at least one fastener disposed such that it couples the upper female portion to the lower female portion.

4. The modular junction box of claim 1, wherein the male component comprises:
an upper male portion; and
a lower male portion coupled to the upper male portion.

5. The modular junction box of claim 4, further comprising:
at least one fastener disposed such that it couples the upper male portion to the lower male portion.

6. The modular junction box of claim 1, wherein the port is partially formed by each of the female component and the male component.

7. The modular junction box of claim 6, wherein a first portion of the port formed by the female component comprises between fifty-five and sixty percent of an area of the port.

8. The modular junction box of claim 1, wherein the modular adapter element defines a diameter that is equivalent to a diameter of the port.

9. The modular junction box of claim 1 wherein the at least one adapter surface of the modular adapter element is in contact with the latch surface of the at least one latch arm.

10. The modular junction box of claim 1 wherein the at least one latch arm defines a latching portion and a back portion opposing the latching portion, the latching portion receivable within the at least one mating slot of the female component, the back portion including the latch surface engageable by the at least one adapter surface of the modular adapter element.

11. The modular junction box of claim 1 wherein the modular adapter element includes a flange, the flange defining the at least one adapter surface.

12. The modular junction box of claim 11 wherein the modular adapter element defines a peripheral channel adjacent the flange, the peripheral channel receiving inner portions of the one or more of the female component and the male component forming the port to facilitate mounting of the modular adapter element within the port.

13. The modular junction box of claim 1 wherein the female component and the male component collectively define the port.

14. The modular junction box of claim 13 including at least one second port defined by the one or more of the female component and the male component.

15. The modular junction box of claim 14 including a coupling disposed within the at least one second port.

16. A modular junction box, comprising:
a first component defining at least one first mating feature;

a second component defining at least one second mating feature cooperatively dimensioned to engage and establish an interlocked relation with the at least one first mating feature to thereby couple the second component to the first component; and a modular adapter element at least partially positionable within a port formed by the first component and the second component, the modular adapter element configured to engage one of the at least one first mating feature and the at least one second mating feature to maintain the interlocked relation thereof and prevent decoupling of the first component and the second component.

17. A modular junction box, comprising:

a female component including an upper female portion and a lower female portion couplable to the upper female portion, each of the upper female portion and the lower female portion defining a mating slot;

a male component including an upper male portion and a lower male portion couplable to the upper male portion, each of the upper male portion and the lower male portion defining a latch arm cooperatively dimensioned to be at least partially received within respective mating slots of the upper female portion and the lower female portion to establish an interlocked relation therebetween; and a modular adapter element disposed in a port formed by the female component and the male component, the modular adapter element including a flange and a peripheral channel adjacent the flange, the flange dimensioned to engage latch surfaces of the latch arms to maintain the interlocked relation thereof and prevent decoupling of the female component and the male component.

18. The modular junction box of claim 17 including a second port defined the female component and the male component.

19. The modular junction box of claim 18 including a coupling disposed within the second port.

\* \* \* \* \*